(12) United States Patent
Matsuura

(10) Patent No.: US 9,179,158 B2
(45) Date of Patent: Nov. 3, 2015

(54) DECODE PROCESSING APPARATUS, DECODE PROCESSING METHOD, DATA DISTRIBUTION PROGRAM, AND DECODE PROCESSING PROGRAM

(75) Inventor: Masaru Matsuura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 794 days.

(21) Appl. No.: 12/780,216

(22) Filed: May 14, 2010

(65) Prior Publication Data

US 2010/0296585 A1 Nov. 25, 2010

(30) Foreign Application Priority Data

May 22, 2009 (JP) ............................... P2009-124180

(51) Int. Cl.
*H04N 7/12* (2006.01)
*H04N 19/436* (2014.01)
*H04N 19/17* (2014.01)
*H04N 19/44* (2014.01)

(52) U.S. Cl.
CPC ............. *H04N 19/436* (2014.11); *H04N 19/17* (2014.11); *H04N 19/44* (2014.11)

(58) Field of Classification Search
USPC ............. 375/240.15, 240.24, 240.25, 240.01, 375/240.03, 240.12, 240.28, 240.29, 375/E07.27; 348/402.1, 714–722; 382/233, 382/234
See application file for complete search history.

(56) References Cited

U.S. PATENT DOCUMENTS

| | | | | |
|---|---|---|---|---|
| 5,646,687 A | * | 7/1997 | Botsford et al. | 375/240.12 |
| 2001/0021227 A1 | * | 9/2001 | Ngai | 375/240.28 |
| 2002/0172280 A1 | * | 11/2002 | Ducloux et al. | 375/240.12 |
| 2003/0138045 A1 | * | 7/2003 | Murdock et al. | 375/240.12 |
| 2003/0189982 A1 | * | 10/2003 | MacInnis | 375/240.24 |
| 2004/0258162 A1 | * | 12/2004 | Gordon et al. | 375/240.25 |
| 2005/0062746 A1 | * | 3/2005 | Kataoka et al. | 345/505 |
| 2006/0093042 A1 | * | 5/2006 | Kashima et al. | 375/240.24 |
| 2006/0182353 A1 | * | 8/2006 | Ueno et al. | 382/232 |
| 2007/0053437 A1 | * | 3/2007 | Muller et al. | 375/240.24 |
| 2007/0253491 A1 | * | 11/2007 | Ito et al. | 375/240.24 |
| 2008/0069244 A1 | * | 3/2008 | Yano | 375/240.24 |
| 2008/0219349 A1 | * | 9/2008 | Huang et al. | 375/240.15 |

FOREIGN PATENT DOCUMENTS

| | | |
|---|---|---|
| JP | 7-115649 | 5/1995 |
| JP | 2006-129284 | 5/2006 |
| JP | 2006 129285 | 5/2006 |
| JP | 2006129284 A * | 5/2006 |

(Continued)

*Primary Examiner* — Christopher S Kelley
*Assistant Examiner* — Ana Picon-Feliciano
(74) *Attorney, Agent, or Firm* — Hazuki International, LLC

(57) ABSTRACT

Disclosed herein is a decode processing apparatus including, a plurality of decode processing section configured to decode moving picture data in units of a predetermined processing block, a distribution section configured such that when supplied with encoded moving picture data, the distribution section splits each of screens formed by the moving picture data into vertical bands in units of the processing block as the smallest unit in keeping with the number of the plurality of decode processing section, the distribution section further distributing the moving picture data belonging to each of the split vertical bands to a different one of the decode processing section, and a formation section configured to form the picture data of one screen when supplied with the decoded moving picture data from the plurality of decode processing section.

14 Claims, 9 Drawing Sheets

(56) References Cited

FOREIGN PATENT DOCUMENTS

| JP | 2006129285 | A | * | 5/2006 |
| JP | 2006 319944 | | | 11/2006 |
| JP | 2006319944 | A | * | 11/2006 |
| JP | 2008 72647 | | | 3/2008 |
| JP | 2008072647 | A | * | 3/2008 |
| JP | WO2009-142021 | | | 11/2009 |

* cited by examiner div_mb = INTEGER PART OF (pic_mb_width÷N)   ···(1)
mod_mb = REMAINDER OF (pic_mb_width÷N)   ···(2)

IF i < mod_mb,
    mb_width(i) = div_mb+1   ···(3)

IF i ≧ mod_mb,
    mb_width(i) = div_mb   ···(4)

IF i = 0,
    mb_offset(i) = 0   ···(5)

IF i > 0,
    mb_offset(i) = mb_offset(i−1)+mb_width(i−1)   ···(6)

pic_mb_width = 100(mb), NO. OF DECODE PROCESSORS N=3 div_mb = INTEGER PART OF 100/3 = 33   ···(1)
mod_mb = REMAINDER OF 100/3 = 1   ···(2)

i = 0(REGARDING PROCESSOR 2(0))
i < 1 ∴ mb_width (0) = 33+1 = 34   ···(3)
i = 0 ∴ mb_offset (0) = 0   ···(4)

i = 1(REGARDING PROCESSOR 2(1))
i ≧ 1 ∴ mb_width (1) = 34   ···(5)
i > 0 ∴ mb_offset (1) = 0+34 = 34   ···(6)

i = 2(REGARDING PROCESSOR 2(2))
i ≧ 1 ∴ mb_width (2) = 34   ···(7)
i > 0   mb_offset (2) = 34+33 = 67   ···(8)

pic_mb_width = 101(mb), NO. OF DECODE PROCESSORS N=3 div_mb = INTEGER PART OF 101/3=33 ···(1)
mod_mb = REMAINDER OF 101/3=2 ···(2)

i = 0(REGARDING PROCESSOR 2(0))
i < 2 ∴ mb_width (0)=33+1=34 ···(3)
i = 0    mb_offset (0)=0 ···(4)

i = 1(REGARDING PROCESSOR 2(1))
i ≧ 2    mb_width (1)=33+1=34 ···(5)
i > 0    mb_offset (1)=0+34=34 ···(6)

i = 2(REGARDING PROCESSOR 2(2))
i ≧ 2 ∴ mb_width (2)=33 ···(7)
i > 0    mb_offset (2)=34+34=68 ···(8)

pic_mb_width = 102(mb), NO. OF DECODE PROCESSORS N=3 div_mb = INTEGER PART OF 102/3=34 ···(1)
mod_mb = REMAINDER OF 102/3=0 ···(2)

i = 0(REGARDING PROCESSOR 2(0))
i < 0 ∴ mb_width (0)=34 ···(3)
i = 0 ∴ mb_offset (0)=0 ···(4)

i = 1(REGARDING PROCESSOR 2(1))
i ≧ 0 ∴ mb_width (1)=34 ···(5)
i > 0  mb_offset (1)=0+34=34 ···(6)

i = 2(REGARDING PROCESSOR 2(2))
i ≧ 0 ∴ mb_width (2)=34 ···(7)
i > 0  mb_offset (2)=34+34=68 ···(8)

DECODE PROCESSING APPARATUS, DECODE PROCESSING METHOD, DATA DISTRIBUTION PROGRAM, AND DECODE PROCESSING PROGRAM

BACKGROUND OF THE INVENTION

1. Field of the Invention

The present invention relates to a decode processing apparatus, a decode processing method, a data distribution program, and a decode processing program for decoding moving picture data encoded in units of a predetermined processing block such as a macro block.

2. Description of the Related Art

Recent years have witnessed widespread use of moving picture encoding methods such as MPEG-2 (Moving Picture Experts Group phase 2), MPEG-4 (Moving Picture Experts Group phase 4), H.264 (MPEG-4 Advanced Video Coding), and VC-1 developed by Microsoft Corporation. To use the moving pictures encoded by any one of the methods above involves decode processing. Where moving picture data encoded by one of the moving picture encoding methods is to be decoded by multiple processors that carry out the decode processing in parallel for load distribution purposes, each of the processors typically performs its processing in units of a macro block constituting the minimum processing unit.

As shown in FIG. 11, a macro block is one of split areas making up a picture of a single screen (i.e., one frame) having a predetermined picture width and picture height. Each of the split areas measures 16 by 16 pixels (a square pixel block).

According to the recently developed moving picture encoding methods such as MPEG-4, H.264 and VC-1, it is stipulated that a target macro block be decoded by referencing the decoding results of the macro blocks positioned left, top left, on top, and top right of the macro block to be processed.

For example, as shown in FIG. 12, suppose that the centrally located macro block shown shaded is the macro block to be processed. In this case, decoding the picture data of the macro block in question requires referencing the decoding results of four macro blocks positioned left, top left, on top, and top right of the target macro block. It follows that the decoding of the target macro block needs to be started after completion of the decoding of at least four macro blocks positioned left, top left, on top, and top right of the macro block in question.

Conversely, as long as the above-mentioned order of processing of macro blocks is maintained, decode processing is carried out with no conflict between processors regardless of which processor deals with which macro block. That is, as long as the defined order of processing of macro blocks is kept intact, the multiple processors involved may handle macro blocks in any order.

In the circumstances outlined above, various decode processing methods have been developed. For example, Japanese Patent Laid-open Nos. 2006-129284 and 2006-129285 (hereinafter referred to as the Patent Documents 1 and 2, respectively) disclose a technique whereby macro blocks are processed while processing status (e.g., execution underway, processing completed, etc.) of each of the macro blocks involved is being managed and scanned (in parallel if possible).

Specifically, as shown in FIG. 13, the technique disclosed by the Patent Documents 1 and 2 involves processors each concurrently processing the macro block two blocks left of a target macro block positioned one macro block row above.

That is, as in FIG. 13, each of processors 1, 2 and 3 deals with one row of macro blocks having the width of a picture. The macro blocks positioned one row below are handled by another processor.

Each of the processors 1, 2 and 3 processes each row of macro blocks sequentially from left to right. The macro blocks one row below are each processed two blocks later.

Japanese Patent Laid-open No. 2008-072647 (hereinafter referred to as the Patent document 3) discloses a technique which takes advantage of the absence of dependence between intra macro blocks and inter macro blocks and which involves delimiting each macro block row immediately before an inter macro block so as to determine the boundaries between the macro blocks to be shared by processors.

Japanese Patent Laid-open No. 2006-319944 (hereinafter referred to as the Patent Document 4) discloses a technique that involves slicing a screen horizontally in a manner reflecting the number of decoders in use, the screen slices being shared by the multiple decoders. Slicing the screen horizontally means splitting the screen into a plurality of areas in the vertical direction.

SUMMARY OF THE INVENTION

Where moving picture data encoded by any one of the moving picture encoding methods such as MPEG-4, H.264 or VC-1 is to be decoded, the following three problems (a) through (c) need to be taken into account in order to improve the efficiency of decode execution:

(a) Processor wait times stemming from the order in which macro blocks are allotted to different processors for processing;

(b) The degree of complexity in the scheme for correctly controlling the order in which to process the macro blocks; and (c) The frequency of communicating the processing results of the macro blocks to be referenced, together with the cost of such data transfers required.

In the case of the technique disclosed by the above-cited Patent Documents 1 and 2, the processing status of each macro block is managed so that the problem (a) above can be resolved effectively. However, the degree of complexity is likely to grow, so that the problem (b) above may not be resolved sufficiently.

Also in the case of the technique disclosed by the Patent Documents 1 and 2, there arises the need to communicate the processing results of the macro blocks one row above between a plurality of processors that perform decode processing in units of a macro block. The communication needs to be conducted in a highly frequent manner, illustratively per macro block. Generally, communications between processors need to be carried out via a slow memory (e.g., secondary cache memory) apart from the processors. This, it has been pointed out, can lead to an insufficient resolution of the problem (c) above.

In the case of the technique discussed by the above-cited Patent document 3, the scheme involved is relatively simple so that the problems (a), (b) and (c) appear to be resolved effectively. According to the technique of Patent document 3, however, there are differences between the frequencies of intra macro blocks and inter macro blocks taking place, so that the degree of parallel processing may differ or may even be null depending on the input stream. As a result, the efficiency of executing decode processing may not be improved appreciably.

According to the technique disclosed by the above-cited Patent document 4, the screen is sliced horizontally as mentioned above. This technique can only be applied to MPEG-2 setups in which one macro block row always constitutes one slice.

Slices are also stipulated by MPEG-4, H.264, and VC-1. Since there is no relation of dependence between the macro blocks spanning the slices, it is conceivable to regard the boundaries between the slices as the boundaries of the macro blocks to be shared by processors. However, as in the case of the technique of the Patent document 3 above, the degree of parallel processing may well be null depending on the input stream. Furthermore, where individual pictures are concerned, they are dependent on one another for movement compensation except for I pictures. This renders parallel processing appreciably difficult.

As outlined above, all of the currently proposed decode processing methods have failed to resolve at least one of the problems (a), (b) and (c) above. In that sense, these methods may not be sufficient in improving the efficiency of executing decode processing.

The present invention has been made in view of the above circumstances and provides arrangements capable of clearing all of the problems (a), (b) and (c) above for the purpose of safely and sufficiently raising the efficiency of decoding encoded moving picture data.

In carrying out the present invention and according to one embodiment thereof, there is provided a decode processing apparatus including: a plurality of decode processing means for decoding moving picture data in units of a predetermined processing block; a distribution means configured such that when supplied with encoded moving picture data, the distribution means splits each of screens formed by the moving picture data into vertical bands in units of the processing block as the smallest unit in keeping with the number of the plurality of decode processing means, the distribution means further distributing the moving picture data belonging to each of the split vertical bands to a different one of the decode processing means; and formation means for forming the picture data of one screen when supplied with the decoded moving picture data from the plurality of decode processing means.

Where the present invention is embodied as the above-outlined decode processing apparatus, the distribution means upon receipt of moving picture data splits each screen into vertical bands in units of the processing block as the smallest unit in keeping with the number of decode processing means configured. The moving picture data belonging to each of the split vertical bands is distributed to a different one of the decode processing means.

The moving picture data distributed to the plurality of decode processing means by the distribution means is decoded in units of the predetermined processing block by each of the decode processing means, whereby pixel data is restored and fed to the formation means. In turn, the formation means restores out of the supplied pixel data the picture data of one screen in effect prior to data compression.

As described, the picture data of one screen (i.e., of one frame) is split into vertical bands. Each of the split vertical bands of the screen is decoded by a different one of the decode processing means. According to this structure, when the leftmost or the rightmost portion of each vertical band is to be processed and when the decode processing result of a processing block belonging to another vertical band is needed for such processing, the necessary processing result is acquired by another decode processing means that processes an adjacent vertical band. This eliminates the need for wait times during the processing performed by the decode processing means.

At the leftmost and rightmost portions of each vertical band, the transmission and reception of processing results between the decode processing means dealing with adjacent vertical bands need only be considered. This makes it relatively easy to control the order in which processing blocks are processed.

The transmission and reception of decode processing results take place only at the leftmost and rightmost portions of each vertical band. That means the communications of decode processing results between the decode processing means are reduced. This translates into reduced costs of data transfers.

That is, the wait times for the decode processing means may be eliminated. There is no need to install complicated arrangements for controlling the order of decode processing, with data communications between the decode processing means brought to a minimum. This makes it possible to carry out efficient decode processing as a whole.

According to an embodiment of the present invention, as outlined above, the wait times for processing between the plurality of decode processing means may be eliminated.

The degree of dependence between the plurality of decode processing means is lowered, and the order in which processing blocks are processed by the means is controlled with ease.

Also, the frequency of communications (i.e., transmission and reception) of decode processing results between the plurality of decode processing means is reduced. This in turn lowers data communication costs.

BRIEF DESCRIPTION OF THE DRAWINGS

Further objects and advantages of the present invention will become apparent upon a reading of the following description and appended drawings in which.

DETAILED DESCRIPTION OF THE PREFERRED EMBODIMENTS

Figure 1:
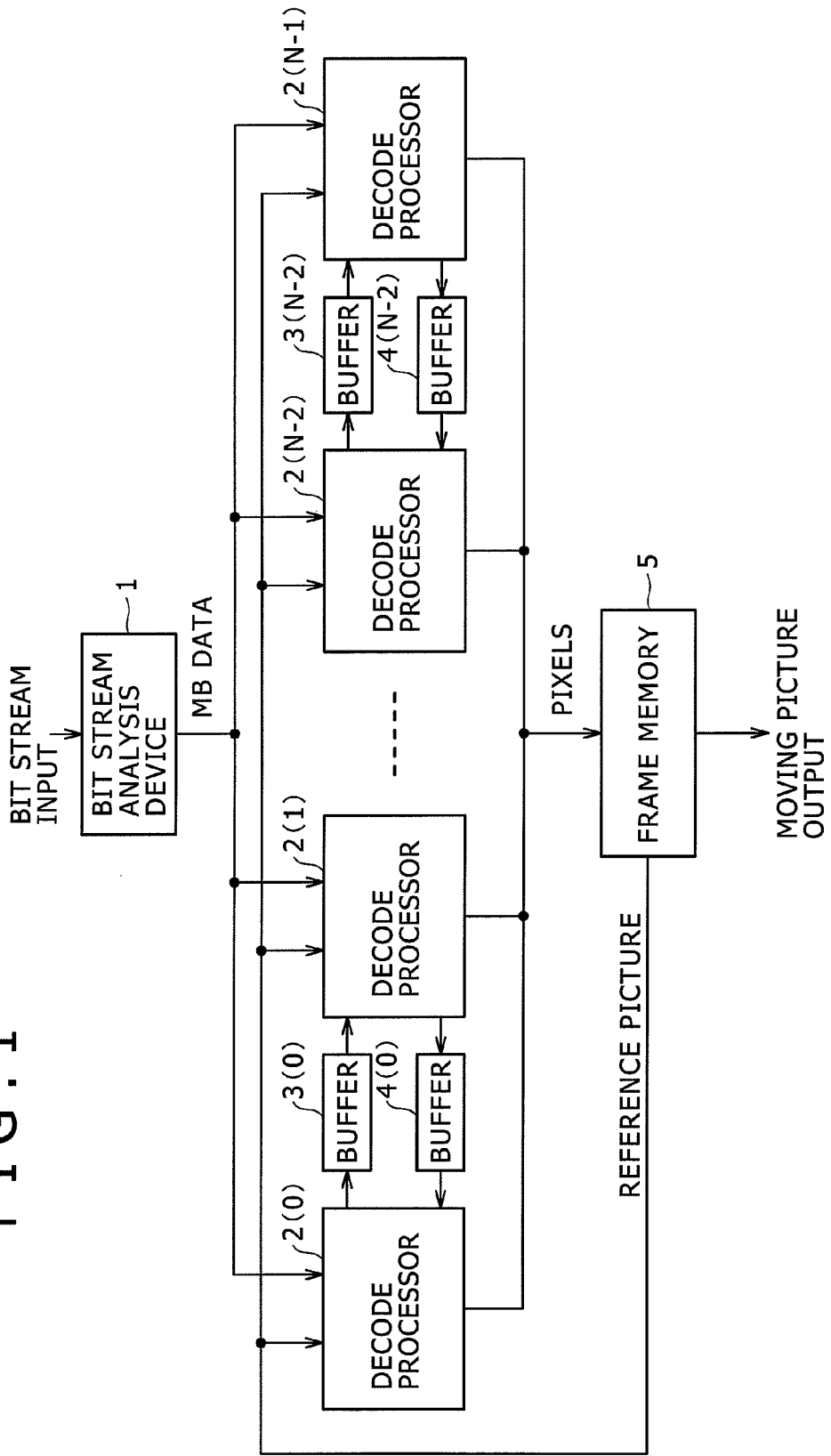
FIG. 1 is a block diagram explanatory of a typical structure of a decode processing apparatus as one embodiment of the present invention.

The preferred embodiments of the present invention representing an apparatus, a method, and a program will now be described below in reference to the accompanying drawings.

Outline of the Embodiments

The decode processing apparatus to be explained below as one embodiment of the present invention embraces the method and program also embodying the invention. This decode processing apparatus is capable of decoding moving picture data encoded by any one of the recently proposed moving picture encoding schemes such as MPEG-4, H.264, and VC-1.

An outline of the decode processing apparatus embodying the present invention will now be explained. The decode processing apparatus performs decode processing of moving picture data in units of a macro block (mb). The apparatus contains a plurality of decode processors (i.e., decode processing units) for parallel processing purposes.

The decode processing apparatus of this embodiment splits each screen formed by encoded moving picture data into vertical bands (band-like areas). All macro blocks belonging to each vertical band are processed by one of the decode processors. The vertical bands may be said to be split portions created by splitting the screen.

Each decode processor decodes, in units of a macro block, the vertical band allotted to the decode processor in question, starting from the top left macro block and proceeding from left to right and from top to bottom macro block rows.

As mentioned above in reference to FIG. 12, the recently proposed moving picture encoding formats such as MPEG-4, H.264, and VC-1 require that the macro block targeted for decoding be decoded by referencing the macro blocks positioned left, top left, on top, and top right of the target macro block.

The requirement above is met by each decode processor dealing with each macro block row as follows:

(1) Before decoding the leftmost macro block of a given vertical band, the decode processor in charge receives the processing result of the macro block positioned left from another decode processor processing the vertical band positioned left.

(2) After decoding the leftmost macro block of the vertical band, the decode processor in charge transmits the decoding result to the decode processor processing the vertical band positioned left.

(3) Before processing the rightmost macro block of the vertical band, the decode processor in charge receives the processing result of the macro block positioned top right of the target macro block from another decode processor processing the vertical band positioned right.

(4) After decoding the rightmost macro block of the vertical band, the decode processor in charge transmits the processing result to the decode processor processing the vertical band positioned right.

The transmission and reception (i.e., communication processing) of decode processing results between the decode processors are carried out through blocking access by way of a buffer arrangement.

That is, the decode processor ready to receive the decode processing result of another macro block is placed in a wait state while the buffer is being vacant. The decode processor ready to transmit the decode processing result of a macro block is also placed in a wait state while the buffer is being full.

In such cases, the data (i.e., decode processing result) transmitted to and placed temporarily in the buffer for reception by another decode processor is retrieved therefrom on a first-in first-out (FIFO) basis. The storage capacity of the buffer is made larger than the size of the decode processing result of one macro block being transferred.

Also, the decode processing apparatus of this embodiment adopts a scheme whereby the decode processing devices configured therein decode the vertical bands of the screen parallelly in what may be called a stepped pattern.

More specifically, the decode processor dealing with the leftmost band of the screen starts decode processing from the first macro block row at the top. When the decode processor reaches the second macro block row, another decode processor dealing with the vertical band positioned immediately right starts processing the top macro block row of the vertical band.

When the decode processor dealing with the leftmost vertical band of the screen reaches the third macro block row from the top, the decode processor handling the vertical band positioned immediately right starts processing the second macro block row of the vertical band.

Then another decode processor handling the vertical band positioned further right starts processing the first macro block row at the top. In this manner, a macro block positioned one macro block row away in each different vertical band is processed by a different decode processor in a stepped pattern.

The arrangement above eliminates those wait times of decode processors which are liable to occur due to the sequential relations of the macro blocks allotted to different decode processors in ordinary setups.

Also, the arrangement for correctly controlling the order in which to process macro blocks is made as simple as possible. Specifically, as discussed above, the transmission and reception of decode processing results between decode processors are carried out through blocking access by way of the buffer arrangement.

Furthermore, the screen is split into vertical bands, and each of the vertical bands is allotted to a different one of the decode processors configured. This structure makes it possible for each decode processor to exchange data with another decode processor only when the leftmost and the rightmost blocks of the vertical band in question are dealt with.

As a result, the frequency of communications for transmitting and receiving the decode processing results of macro blocks between decode processors is lowered. This translates into reduced data transfer costs. What follows is a more detailed explanation of the decode processing apparatus of this embodiment.

[Typical Structure of the Decode Processing Apparatus]

FIG. 1 is a block diagram explanatory of a typical structure of the decode processing apparatus of this embodiment. As shown in FIG. 1, the decode processing apparatus includes a bit stream analysis device 1 and a plurality of decode processors 2(0), 2(1), . . . 2(N−1).

Between the decode processor, there are provided interposingly first transmission and reception buffers 3(0), 3(1), . . . 3(N−2); second transmission and reception buffers 4(0), 4(1), . . . 4(N−2); and a frame memory 5.

As will be explained later in more detail, the bit stream analysis device 1 functions as distribution means for receiving a bit stream, dividing it into a plurality of portions, and distributing them to a plurality of decode processors 2(0), 2(1), . . . 2(N−1) positioned downstream.

Each of the decode processors 2(0), 2(1), . . . 2(N−1) functions as decode processing means for performing decode processing of moving picture data encoded in units of a macro block.

The frame memory 5 functions as formation means for receiving decoded picture data from the plurality of decode processors 2(0), 2(1), . . . 2(N−1) and forming the picture data of one screen (i.e., one picture or one frame) out of the received data.

The bit stream analysis device 1 is supplied with a bit stream made up of encoded moving picture data from the outside. The sources of bit streams typically include a tuner device that receives and demodulates broadcast signals having been encoded and transmitted, and a reproduction processing device that reads and reproduces digital contents that are encoded and recorded on recording media such as DVD (digital versatile disc).

Bit streams are entropy-encoded. When supplied with such a bit stream, the bit stream analysis device 1 entropy-decodes it in accordance with the currently utilized moving picture encoding standard by which the supplied bit stream has been entropy-encoded.

If, during entropy decoding, some parameters regarding the whole moving picture to be decoded or an entire picture targeted to be processed are acquired, then the bit stream analysis device 1 forwards the acquired parameters to all downstream decode processors 2(0) through 2(N−1) without distinction. The parameters that may be obtained illustratively include DCT (discrete cosine transform) coefficients and motion vectors.

Figures 2, 3:
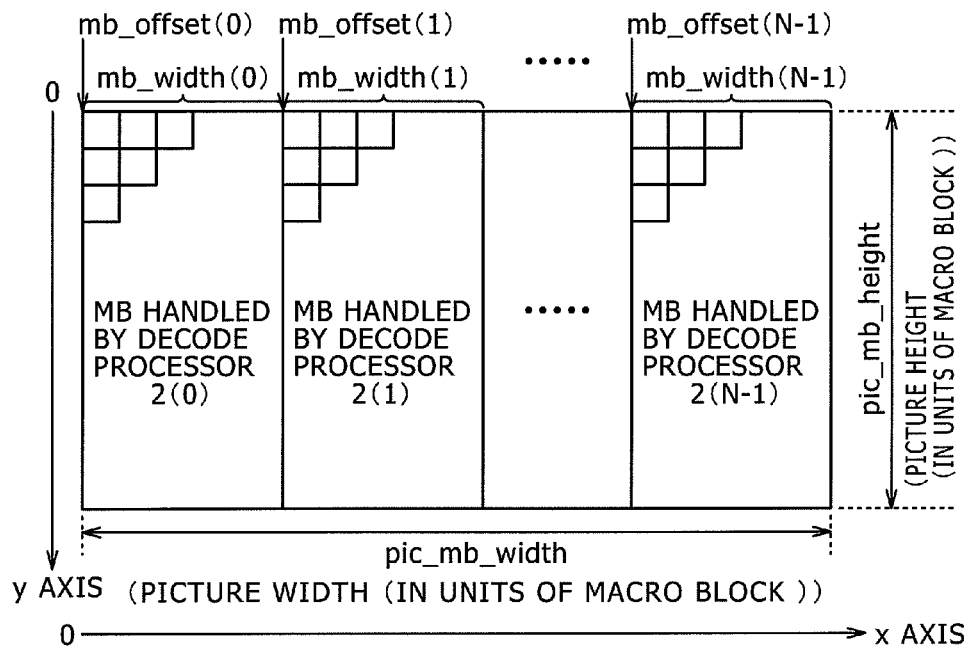
FIG. 2 is a schematic view explanatory of how picture data is distributed by a bit stream analysis device of the decode processing apparatus.
FIG. 3 is another schematic view also explanatory of how picture data is distributed by the bit stream analysis device.

The bit stream analysis device 1 proceeds to acquire macro block data of one picture (one screen). Then the bit stream analysis device 1 splits one picture (one screen) of interest into a plurality of vertical bands according to a predetermined scheme. As will be described later in more detail, the screen is split in the horizontal direction into a plurality of vertical bands as shown in FIG. 2.

The bit stream analysis device 1 then distributes the macro block data belonging to each of the vertically split bands to the decode processors 2(0) through 2(N−1) which are assigned fixedly to the respective vertical bands. The bit stream analysis device 1 repeats the process of such macro block data distribution as many times as the number of pictures (screens) included in the bit stream of interest.

As described, the bit stream analysis device 1 splits each picture (screen) into a plurality of vertical bands according to a predetermined scheme, and distributes the macro block data belonging to each of the vertical bands to the decode processors 2(0) through 2(N−1) assigned fixedly to these vertical bands.

The bit stream analysis device 1 need only perform a minimum of decoding necessary for correctly entropy-decoding the macro block data. For example, there is no need to carry out inverse DCT processing with regard to DCT coefficients. Such decode processing independent of entropy decoding may be performed by the decode processors 2(0) through 2(N−1).

Each of the decode processors 2(0) through 2(N−1) performs final decode processing of the macro block data from the bit stream analysis device 1 in units of a macro block, by referring to reference pictures fed from the frame memory 5.

More specifically, each of the decode processors 2(0) through 2(N−1) carries out such processes as inverse zigzag conversion, inverse quantization, inverse orthogonal transformation (including overlap smoothing filter), and intra-screen prediction (including AC/DC prediction).

Also, each of the decode processors 2(0) through 2(N−1) performs such processes as motion vector prediction, motion compensation (including weighted prediction, range reduction, and intensity compensation), and deblocking filter.

Figure 12:
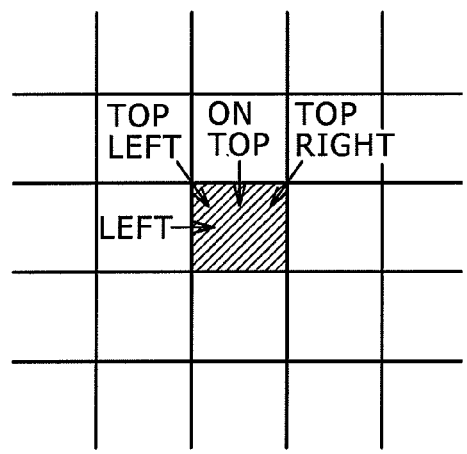
FIG. 12 is a schematic view explanatory of the surrounding macro blocks of which the decoding results are referenced for decode processing in units of a macro block.
Figure 13:
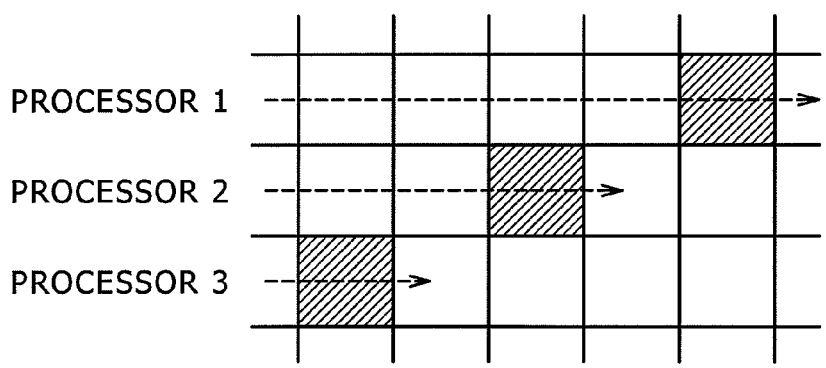
FIG. 13 is a schematic view explanatory of how a screen is sliced for traditional decode processing.

As mentioned above, the bit stream analysis device 1 splits each screen (picture) into a plurality of vertical bands, and allots the macro block data of each vertical band to a different one of the decode processors. Upon decoding, as shown in FIG. 12, each decode processor requires the decoding results of the macro blocks positioned left, top left, on top, and top right of the macro block being targeted for processing.

For that reason, when processing the leftmost or the rightmost macro blocks of the vertical band targeted to be processed, each of the decode processors 2(0) through 2(N−1) is required to transmit and receive data to and from adjacent decode processors.

Thus when the leftmost or the rightmost macro blocks of each vertical band are to be processed and when data is to be exchanged with an adjacent decode processor, each decode processor uses the first buffer 3 and the second buffer 4 interposed between the decode processors for data exchange purposes.

That is, in FIG. 1, the first buffers 3(0) through 3(N−1) constitute a buffering module for transferring data from the decode processor 3(i) to the decode processor 3(i+1). The variable "i" is an integer between 0 and N−2.

Likewise, the second buffers 4(0) through 3(N−1) constitute a buffering module for transferring data from the decode processor 4(i+1) to the decode processor 4(i). The variable "i" is an integer between 0 and N−2.

The first buffers 3(0) through 3(N−2) and the second buffers 3(0) through 4(N−2) are accessed on a blocking access basis. That is, when ready to read data from the first buffer 3(i−1) or from the second buffer 4(i), the decode processor 2(i) is placed in a wait state if the buffer in question is vacant. The decode buffer 2(i) then waits for the data to be placed into that buffer.

Similarly, when ready to write data to the second buffer 4(i−1) or the first buffer 3(i), the decode processor 2(i) is placed in a wait state if the buffer in question is full. The decode processor 2(i) waits for the buffer to restore a free area inside. In this case, the data read from the buffer is deleted so that the buffer restores its free area.

As described, the first buffer 3 and the second buffer 4 are accessed on a blocking access basis so that the order in which to process macro blocks is controlled simply and precisely.

Incidentally, the capacity of the first buffers 3(0) through 3(N−2) and that of the second buffer 4(0) through 4(N−2) need only be as large as the data size of the processing result of one macro block to be communicated.

Obviously, it is also possible to have a buffer capacity with room for larger data sizes. If the capacity of the first buffers 3(0) through 3(N−2) and that of the second buffer 4(0) through 4(N−2) are sufficiently large, then data may be written and read to and from the buffers on a first-in first-out (FIFO) basis.

As described above, the first buffers 3(0) through 3(N−2) and the second buffers 4(0) through 4(N−2) are provided interposingly between the decode processors. This structure permits the decode processors to exchange therebetween the decode processing results of the macro block immediately adjacent to another vertical band of the screen.

Where the leftmost vertical band of the screen is to be processed, there exists no macro block to the left side and thus there is no need to reference the processing results of the macro blocks positioned left and top left of the target macro block. Likewise, where the rightmost vertical band of the screen is to be processed, there exists no macro block to the right and thus there is no need to reference the processing result of the macro block positioned top right of the target macro block.

The picture data obtained through decode processing by each of the decode processors 2(0) through 2(N−1) is supplied and recorded to the frame memory 5. The frame memory 5 temporarily accommodates the picture data of the decoding results coming from the decode processors 2(0) through 2(N−1).

As shown in FIG. 1, the picture data stored temporarily in the frame memory 5 is referenced as the referenced picture for motion compensation by each of the decode processors 2(0) through 2(N−1), or is output to the outside as the picture data with which to form a moving picture.

As described above, the decode processing apparatus of this embodiment, when supplied with the bit stream, has the bit stream analysis device 1 splitting each screen into vertical bands. The macro block data belonging to each of the vertically split bands is supplied to a different one of the decoded processors 2(0) through 2(N−1) which carry out decode processing in parallel.

As will be discussed later, the decode processing apparatus of this embodiment distributes each of the vertically split bands of the screen to a different one of the decode processors as shown in FIG. 2. The leftmost vertical band of the screen is allotted to the decode processor 2(0), the vertical band positioned next is allotted to the decode processor 2(1), and so on, within the decode processing apparatus.

The decode processor 2(0) dealing with the leftmost vertical band of the screen starts decode processing from the first macro block row at the top of the leftmost vertical band. When the decode processor 2(0) reaches the second macro block row, the decode processor 2(1) handling the vertical band positioned right starts processing the first macro block row at the top of that vertical band.

When the decode processor 2(0) dealing with the leftmost vertical band of the screen reaches the third macro block row from the top, the decode processor 2(1) handling the vertical band positioned right starts processing the second macro block row from the top of the vertical band.

The decode processor 2(2) dealing with the vertical band positioned further right then starts processing the first macro block row at the top. In this manner, the concurrently processed macro block rows form a staggered pattern across the vertical bands of the screen.

As described, when the macro blocks surrounding the macro block targeted to be decoded are referenced during parallel processing as shown in FIG. 12, the order in which to process the macro blocks is not altered significantly.

[Splitting of the Screen and Distribution of Macro Block Data]

Described below is the process performed by the bit stream analysis device 1 for distributing macro block data to the decode processors 2(0) through 2(N−1). FIGS. 2 and 3 are schematic views explanatory of how macro block data is typically distributed to the decode processors 2(0) through 2(N−1) by the bit stream analysis device 1.

As shown in FIG. 2, the bit stream analysis device 1 of this embodiment splits each screen (i.e., picture) contained in the supplied bit stream into as many vertical bands in the horizontal direction as the number of the decode processors 2(0) through 2(N−1) configured. In this case, the starting position of each vertical band (i.e., top left position) is determined by mb_offset(i) and the width thereof (width in the horizontal direction) by mb_width(i) for control purposes.

How the screen is split into vertical band will now be explained in more detail. In this embodiment, as shown in FIG. 2, the picture width in units of the macro block as the smallest unit regarding each screen formed by the bit stream targeted for processing is determined by pic_mb_width. Also as shown in FIG. 2, the picture height in units of the macro block as the smallest unit regarding each screen formed by the target bit stream is determined by pic_mb_height.

For example, suppose that the bit stream contains pictures of 1,920 by 1,080 pixels complying with the so-called full high definition (HD) television standard. In this case, if each screen is converted into 16 by 16 pixel macro blocks each serving as the smallest unit, the picture width (pic_mb_width) is represented by 120 macro blocks (mb) and the picture width (pic_mb_height) by 68 macro blocks (mb).

As described, the picture width (pic_mb_width) and the picture height (pic_mb_height) used by the bit stream analysis device 1 of this embodiment are derived from conversion of the screen in units of the macro block as the smallest unit. Thus in the ensuing description, the coordinates of the positions on the screen will all be defined in units of macro blocks.

For the bit stream analysis device 1, the number of the decode processors 2(0) through 2(N−1) configured downstream is defined by a variable N. In this example, as shown in FIG. 1, the variable (index) for identifying each decode processor starts at 0 (zero) so that the number of the configured decode processors is given as N.

Furthermore, each of the decode processors 2(0) through 2(N−1) is assigned variables mb_offset(i) and mb_width (i). The variable mb_offset(i), as shown in FIG. 2, denotes the starting position (i.e., top left position), in the horizontal direction (along the x axis), of each vertical band formed by splitting the screen. The variable mb_width(i), also as shown in FIG. 2, indicates the width of each vertical band (band width) formed by splitting the screen.

With this embodiment, as discussed above, each screen (picture) is split in the horizontal direction as shown in FIG. 2 so that the size of each band remains unchanged in the vertical direction (of the screen).

The range of each vertically split band of the screen can thus be appropriately determined by the starting position mb_offset(i) in the horizontal direction (along x axis) of the vertical band of interest and by the width mb_width(i) of that vertical band.

Thereafter, the variables mb_offset(i) and mb_width(i) are obtained through the use of the picture width (pic_mb_width) and picture height (pic_mb_height) in units of the above-mentioned macro block as the smallest unit as well as the number N of the decode processors configured.

A more detailed way of obtaining these values is shown in FIG. 3. As indicated by the expression (1) in FIG. 3, the picture width (pic_mb_width) is divided by the decode processor count N to obtain the integer part of the quotient as the variable div_mb. The expression (1) may be said to be an expression for acquiring the reference width of each vertical band of the screen when the screen is split into as many vertical bands as the number of the decode processors configured.

Acquired next is the variable mod_mb indicative of the remainder of the quotient from the division of the picture width (pic_mb_width) by the decode processor count N, as indicated by the expression (2) in FIG. 3. The expression (2) may be said to be an expression for obtaining the number of macro blocks with which to adjust the reference width of each vertical band acquired by the expression (1) in FIG. 3.

If the variable mod_mb obtained by the expression (2) in FIG. 3 is not 0 (zero), then the reference width of the vertical band denoted by that variable is incremented by 1. That is, if the variable mod_mb is "1," then the reference width plus "1" of a given vertical band constitutes the width of that vertical band. If the variable mod_mb is "2," then the reference width plus "1" of two vertical bands constitutes the width of these two vertical bands.

With this embodiment, the variable "i" thus determines a particular decode processor and provides information of which the value ranges from 0 to N−1 representing the ordinal position of the decode processor of interest in the numbered series of the configured decode processors. The variable "i" also serves as information that determines the vertical band to be handled by the particular decode processor.

For that reason, if the variable "i" is smaller than the remainder mod_mb from the division of the picture width by N, then the expression (3) in FIG. 3 is used to acquire the width mb_width(i) of the vertical band that is handled by the decode processor 2(i) determined by the variable "i." In this case, the reference width plus "1" of the vertical band denoted by the variable div_mb constitutes the width mb_width(i) of the vertical band to be handled by the decode processor 2(i).

Thus, as long as i<mod_mb, the width mb_width(i) of the vertical band that is dealt with by the decode processor 2(i) is obtained by adding "1" to the reference width div_mb.

If the variable "i" is equal to or larger than the remainder mod_mb from the division of the picture width by N, then the expression (4) in FIG. 3 is used to acquire the width mb_width (i) of the vertical band that is handled by the decode processor 2(i) determined by the variable "i."

In that case, the reference width itself of the vertical band denoted by the variable div_mb constitutes the width mb_width(i) of the vertical band to be handled by the decode processor 2(i). Thus as long as i≥mod_mb, the reference width div_mb itself becomes the width mb_width(i) of the vertical band that is handled by the decode processor 2(i).

The value mb_offset(i) indicative of the starting position of each vertical band (i.e., top left position) is acquired by taking into account the width mb_width(i) of each vertical band calculated by use of the expressions (3) and (4) in FIG. 3.

Specifically, if the variable "i" is 0 (zero), it points to the leftmost vertical band to be handled by the first decode processor 2(0). It follows that the starting position mb_offset(0) of the vertical band that is handled by the decode processor 2(0) is 0 (zero), as indicated by the expression (5) in FIG. 3.

If the variable "i" is larger than 0 (zero), then adding the width of the immediately preceding vertical band to the starting position of that vertical band provides the starting position mb_offset(i) for the decode processor (i). Thus if the variable "i" is larger than 0 (zero), the starting position mb_offset(i) of the vertical band to be handled by the decode processor (i) is obtained using the expression (6) in FIG. 3.

That is, when the variable "i" is larger than 0 (zero), the starting position mb_offset(i) is acquired by adding the width mb_width(i−1) of the immediately preceding vertical band to the starting position mb_offset(i−1) of that vertical band.

The above procedure, as shown in FIG. 2, allows the bit stream analysis device 1 to properly identify and split the vertical band of which the picture height pic_mb_height remains unchanged but of which the starting position mb_offset(i) and width mb_width(i) are changed.

As shown in FIG. 2, each screen can then be split into as many vertical bands as the number of the decode processors 2(0) through 2(N−1) configured. And as shown in FIG. 2, it is then possible to properly identify the starting positions mb_offset(0) through mb_offset(N−1) of the vertical bands and their widths mb_width(0) through mb_width(N−1).

Referring to FIG. 2, the bit stream analysis device 1 supplies the decode processor 2(0) with the macro block data of the leftmost vertical band of the screen as the vertical band to be dealt with by that decode processor 2(0).

Also referring to FIG. 2, the bit stream analysis device 1 supplies the decode processor 2(1) with the macro block data of the second vertical band from left of the screen as the vertical band to be dealt with by that decode processor 2(1). In this manner, the macro block data of the split vertical bands are distributed to the decode processors 2(0) through 2(N−1) allotted to these vertical bands respectively.

The bit stream analysis device 1 can thus distribute the macro block data to the corresponding decode processors on the basis of the variables mb_offset(i) and mb_width (i) obtained as explained above in reference to FIG. 3.

More specifically, the macro block data of which the horizontal position is larger than mb_offset(i) and less than mb_offset(i) plus mb_width(i) need only be transmitted to the decode processor 2(i).

[Specific Examples of How the Screen is Split and How Macro Block Data is Distributed]

Explained next are some specific examples of the processes performed by the bit stream analysis device 1 for splitting the screen and distributing macro block data as discussed above in reference to FIGS. 2 and 3. FIGS. 4A through 6B are schematic views explanatory of how each screen is illustratively split and how macro block data is illustratively distributed by the bit stream analysis device 1.

Figures 5A, 5B:
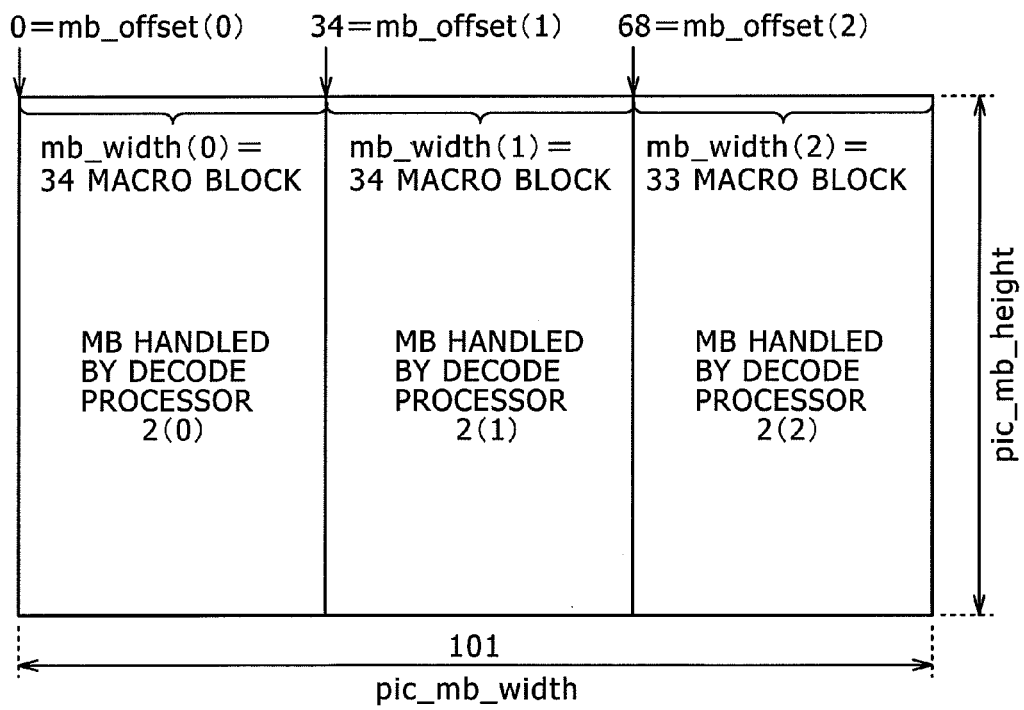
FIGS. 5A and 5B are other schematic views also explanatory of how a screen is illustratively split and how macro block data is illustratively distributed by the bit stream analysis device.
Figures 6A, 6B:
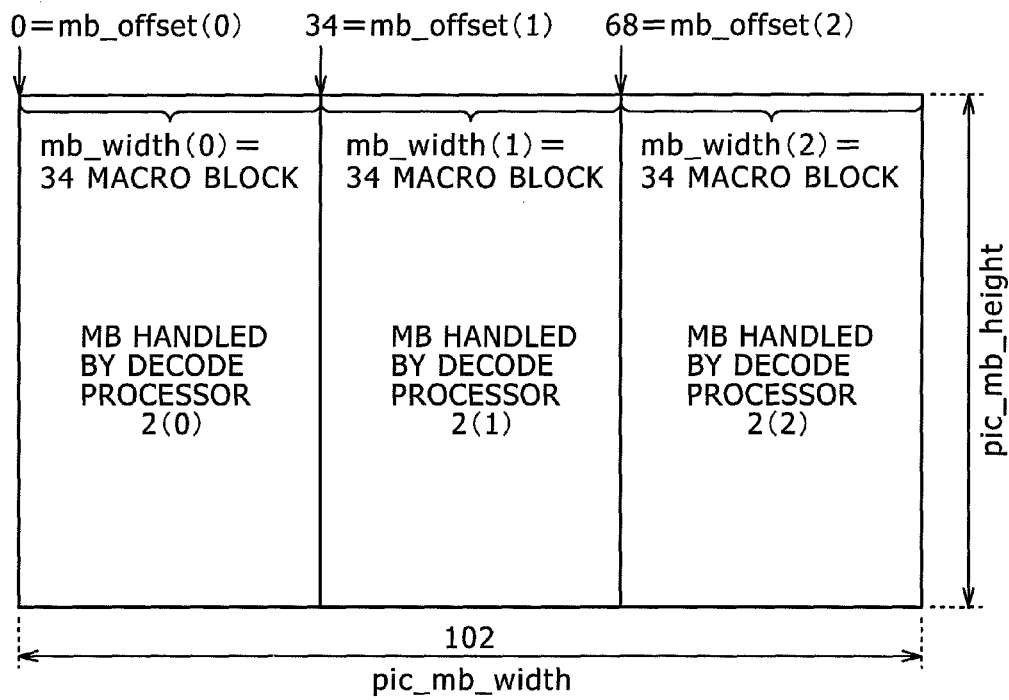
FIGS. 6A and 6B are other schematic views also explanatory of how a screen is illustratively split and how macro block data is illustratively distributed by the bit stream analysis device.

Three examples will now be discussed: one in which the picture width pic_mb_width in units of the macro block as the smallest unit is 100 macro blocks (FIGS. 4A and 4B); another in which the picture width pic_mb_width in units of the macro block as the smallest unit is 101 macro blocks (FIGS. 5A and 5B); and another in which the picture width pic_mb_width in units of the macro block as the smallest unit is 102 macro blocks (FIGS. 6A and 6B). For each of these examples, the number of the configured decode processors is assumed to be three.

[Where the Picture Width is 100 Macro Blocks]

Figures 4A, 4B:
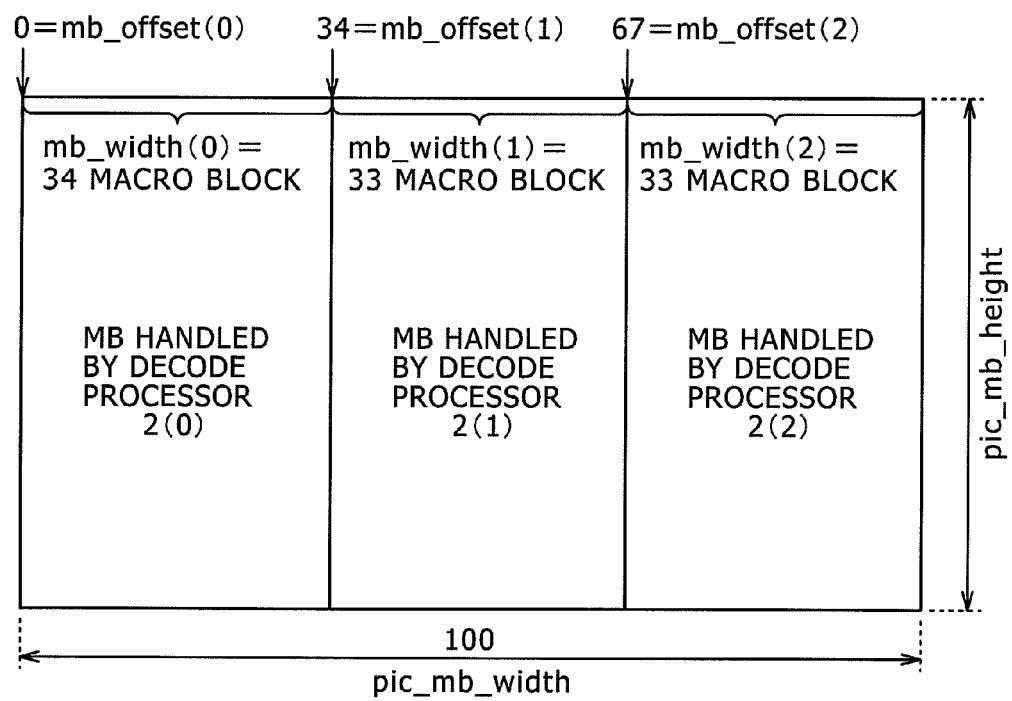
FIGS. 4A and 4B are schematic views explanatory of how a screen is illustratively split and how macro block data is illustratively distributed by the bit stream analysis device.

FIGS. 4A and 4B are explanatory of what kind of processing the bit stream analysis device 1 performs where the picture width pic_mb_width in units of the macro block as the smallest unit is 100 macro blocks and where the number N of the decode processors configured is three.

FIG. 4A shows the process performed by the bit stream analysis device 1. FIG. 4B is a schematic view explanatory of how the screen is typically split into vertical bands by the bit stream analysis device 1.

In this example, as indicated by the expression (1) in FIG. 4A, the picture width "100" expressed in units of macro blocks is divided by the decode processor count "3" to give the quotient of "33." The quotient "33" is then input to the variable div_mb which serves as the reference width of each vertical band.

And as indicated by the expression (2) in FIG. 4A, the remainder "1" from the division of the picture width "100" in units of macro blocks by the decode processor count "3" is input to the variable mod_mb.

The width mb_width(i) of each vertical band and the starting position mb_offset(i) thereof are then determined based on the variables div_mb and mod_mb obtained as described above as well as on the variable "i."

For the vertical band that is handled by the decode processor (0), the variable "i" is 0 (zero), which is smaller than the value "1" of the variable mod_mb (i<1). The expression (3) in FIG. 3 is thus applicable to this case. As indicated by the expression (3) in FIG. 4A, the width mb_width(0) of the vertical band in question is given as "34." That is, the width mb_width(0) of the vertical band of interest is the reference width "33" plus "1."

For the vertical band that is handled by the decode processor (0), the variable "i" is 0 (zero), which is the same as the reference value "0" as indicated by the expression (5) in FIG. 3 (i=0). The expression (5) in FIG. 3 is thus applicable to this case. As indicated by the expression (4) in FIG. 4A, the starting position mb_offset(0) of the vertical band in question is given as 0 (zero).

For the vertical band that is handled by the decode processor (1), the variable "i" is 1, which is the same as the value "1" of the variable mod_mb (i=1). The expression (4) in FIG. 3 is thus applicable to this case. As indicated by the expression (5) in FIG. 4A, the width mb_width(1) of the vertical band in question is given as "33." That is, the width mb_width(1) of the vertical band of interest remains the same as the reference width "33."

For the vertical band that is handled by the decode processor (1), the variable "i" is 1, which is larger than the reference value "0" as indicated by the expression (6) in FIG. 3 (i>0). The expression (6) in FIG. 3 is thus applicable to this case. As indicated by the expression (6) in FIG. 4A, the starting position mb_offset(1) of the vertical band in question is given as "34."

That is, the starting position mb_offset(1) of the currently handled vertical band is determined by adding the width mb_width(0)(=34) of the immediately preceding vertical band to the starting position mb_offset(0)(=0) of that vertical band.

For the vertical band that is handled by the decode processor (2), the variable "i" is 2, which is larger than the value "1" of the variable mod_mb (i>1). The expression (4) in FIG. 3 is thus applicable to this case. As indicated by the expression (7) in FIG. 4A, the width mb_width(2) of the vertical band in question is given as "33." That is, the width mb_width(2) of the vertical band of interest remains the same as the reference width "33."

For the vertical band that is handled by the decode processor (2), the variable "i" is 2, which is larger than the reference value "0" as indicated by the expression (6) in FIG. 3 (i>0). The expression (6) in FIG. 3 is thus applicable to this case. As indicated by the expression (8) in FIG. 4A, the starting position mb_offset(2) of the vertical band in question is "67."

That is, the starting position mb_offset(1) of the currently handled vertical band is determined by adding the width mb_width(1)(=33) of the immediately preceding vertical band to the starting position mb_offset(1)(=33) of that vertical band.

In this example, as shown in FIG. 4B, the vertical band to be handled by the decode processor 2(0) is determined by the starting position mb_offset(0)(=0) and width mb_width(0)(=34) of that vertical band.

In like manner, the vertical band to be handled by the decode processor 2(1) is determined by the starting position mb_offset(1)(=34) and width mb_width(1)(=33) of that vertical band.

Also, the vertical band to be handled by the decode processor 2(2) is determined by the starting position mb_offset(2)(=67) and width mb_width(2)(=33) of that vertical band.

[Where the Picture Width is 101 Macro Blocks]

FIGS. 5A and 5B are explanatory of what kind of processing the bit stream analysis device 1 performs where the picture width pic_mb_width in units of the macro block as the smallest unit is 101 macro blocks and where the number N of the decode processors configured is three.

FIG. 5A shows the process performed by the bit stream analysis device 1. FIG. 5B is a schematic view explanatory of how the screen is typically split into vertical bands by the bit stream analysis device 1.

In this example, as indicated by the expression (1) in FIG. 5A, the picture width "101" expressed in units of macro blocks is divided by the decode processor count "3" to give the quotient of "33." The quotient "33" is then input to the variable div_mb which serves as the reference width of each vertical band.

And as indicated by the expression (2) in FIG. 5A, the remainder "2" from the division of the picture width "101" in units of macro blocks by the decode processor count "3" is input to the variable mod_mb.

The width mb_width(i) of each vertical band and the starting position mb_offset(i) thereof are then determined based on the variables div_mb and mod_mb obtained as described above as well as on the variable "i."

For the vertical band that is handled by the decode processor (0), the variable "i" is 0 (zero), which is smaller than the value "2" of the variable mod_mb (i<2). The expression (3) in FIG. 3 is thus applicable to this case. As indicated by the expression (3) in FIG. 5A, the width mb_width(0) of the vertical band in question is given as "34." That is, the width mb_width(0) of the vertical band of interest is the reference width "33" plus "1."

For the vertical band that is handled by the decode processor (0), the variable "i" is 0 (zero), which is the same as the reference value "0" as indicated by the expression (5) in FIG. 3 (i=0). The expression (5) in FIG. 3 is thus applicable to this case. As indicated by the expression (4) in FIG. 5A, the starting position mb_offset(0) of the vertical band in question is given as 0 (zero).

For the vertical band that is handled by the decode processor (1), the variable "i" is 1, which is smaller than the value "2" of the variable mod_mb (i<2). The expression (3) in FIG. 3 is thus applicable to this case. As indicated by the expression (5) in FIG. 5A, the width mb_width(1) of the vertical band in question is given as "34." That is, the width mb_width(1) of the vertical band of interest is the reference width "33" plus "1."

For the vertical band that is handled by the decode processor (1), the variable "i" is 1, which is larger than the reference value "0" as indicated by the expression (6) in FIG. 3 (i>0). The expression (6) in FIG. 3 is thus applicable to this case. As indicated by the expression (6) in FIG. 5A, the starting position mb_offset(1) of the vertical band in question is given as "34."

That is, the starting position mb_offset(1) of the currently handled vertical band is determined by adding the width mb_width(0)(=34) of the immediately preceding vertical band to the starting position mb_offset(0)(=0) of that vertical band.

For the vertical band that is handled by the decode processor (2), the variable "i" is 2, which is the same as the value "2" of the variable mod_mb (i=2). The expression (4) in FIG. 3 is thus applicable to this case. As indicated by the expression (7) in FIG. 5A, the width mb_width(2) of the vertical band in question is given as "33." That is, the width mb_width(2) of the vertical band of interest remains the same as the reference width "33."

For the vertical band that is handled by the decode processor (2), the variable "i" is 2, which is larger than the reference value "0" as indicated by the expression (6) in FIG. 3 (i>0). The expression (6) in FIG. 3 is thus applicable to this case. As indicated by the expression (8) in FIG. 5A, the starting position mb_offset(2) of the vertical band in question is given as "68."

That is, the starting position mb_offset(1) of the currently handled vertical band is determined by adding the width mb_width(1)(=34) of the immediately preceding vertical band to the starting position mb_offset(1)(=34) of that vertical band.

In this example, as shown in FIG. 5B, the vertical band to be handled by the decode processor 2(0) is determined by the starting position mb_offset(0)(=0) and width mb_width(0) (=34) of that vertical band.

In like manner, the vertical band to be handled by the decode processor 2(1) is determined by the starting position mb_offset(1)(=34) and width mb_width(1)(=34) of that vertical band. Also, the vertical band to be handled by the decode processor 2(2) is determined by the starting position mb_offset(2)(=68) and width mb_width(2)(=33) of that vertical band.

[Where the Picture Width is 102 Macro Blocks]

FIGS. 6A and 6B are explanatory of what kind of processing the bit stream analysis device 1 performs where the picture width pic_mb_width in units of the macro block as the smallest unit is 102 macro blocks and where the number N of the decode processors configured is three.

FIG. 6A shows the process performed by the bit stream analysis device 1. FIG. 6B is a schematic view explanatory of how the screen is typically split into vertical bands by the bit stream analysis device 1.

In this example, as indicated by the expression (1) in FIG. 6A, the picture width "102" expressed in units of macro blocks is divided by the decode processor count "3" to give the quotient of "34." The quotient "34" is then input to the variable div_mb which serves as the reference width of each vertical band.

And as indicated by the expression (2) in FIG. 6A, the remainder from the division of the picture width "102" in units of macro blocks by the decode processor count "3" is input to the variable mod_mb. Since there is no remainder produced in this case, the value "0" is input to the variable mod_mb.

The width mb_width(i) of each vertical band and the starting position mb_offset(i) thereof are then determined based on the variables div_mb and mod_mb obtained as described above as well as on the variable "i."

For the vertical band that is handled by the decode processor (0), the variable "i" is 0 (zero), which is the same as the value "0" of the variable mod_mb (i=0). The expression (4) in FIG. 3 is thus applicable to this case. As indicated by the expression (3) in FIG. 6A, the width mb_width(0) of the vertical band in question is given as "34." That is, the width mb_width(0) of the vertical band of interest remains the same as the reference width "34."

For the vertical band that is handled by the decode processor (0), the variable "i" is 0 (zero), which is the same as the reference value "0" as indicated by the expression (5) in FIG. 3 (i=0). The expression (5) in FIG. 3 is thus applicable to this case. As indicated by the expression (4) in FIG. 6A, the starting position mb_offset(0) of the vertical band in question is given as 0 (zero).

For the vertical band that is handled by the decode processor (1), the variable "i" is 1, which is larger than the value "0" of the variable mod_mb (i>0). The expression (4) in FIG. 3 is thus applicable to this case. As indicated by the expression (5) in FIG. 6A, the width mb_width(1) of the vertical band in question is given as "34." That is, the width mb_width(1) of the vertical band of interest remains the same as the reference width "34."

For the vertical band that is handled by the decode processor (1), the variable "i" is 1, which is larger than the reference value "0" as indicated by the expression (6) in FIG. 3 (i>0). The expression (6) in FIG. 3 is thus applicable to this case. As indicated by the expression (6) in FIG. 6A, the starting position mb_offset(1) of the vertical band in question is given as "34." That is, the starting position mb_offset(1) of the currently handled vertical band is determined by adding the width mb_width(0)(=34) of the immediately preceding vertical band to the starting position mb_offset(0)(=0) of that vertical band.

For the vertical band that is handled by the decode processor (2), the variable "i" is 2, which is larger than the value "0" of the variable mod_mb (i>0). The expression (4) in FIG. 3 is thus applicable to this case. As indicated by the expression (7) in FIG. 6A, the width mb_width(2) of the vertical band in question is given as "34." That is, the width mb_width(2) of the vertical band of interest remains the same as the reference width "34."

For the vertical band that is handled by the decode processor (2), the variable "i" is 2, which is larger than the reference value "0" as indicated by the expression (6) in FIG. 3 (i>0). The expression (6) in FIG. 3 is thus applicable to this case. As indicated by the expression (8) in FIG. 6A, the starting position mb_offset(2) of the vertical band in question is given as "68."

That is, the starting position mb_offset(1) of the currently handled vertical band is determined by adding the width mb_width(1)(=34) of the immediately preceding vertical band to the starting position mb_offset(1)(=34) of that vertical band.

In this example, as shown in FIG. 6B, the vertical band to be handled by the decode processor 2(0) is determined by the starting position mb_offset(0)(=0) and width mb_width(0) (=34) of that vertical band.

In like manner, the vertical band to be handled by the decode processor 2(1) is determined by the starting position mb_offset(1)(=34) and width mb_width(1)(=34) of that vertical band. Also, the vertical band to be handled by the decode processor 2(2) is determined by the starting position mb_offset(2)(=68) and width mb_width(2)(=34) of that vertical band.

As indicated in FIGS. 4A through 6B, the bit stream analysis device 1 can split each of the screens formed by the bit stream into a plurality of vertical bands in keeping with the picture width in units of macro blocks each serving as the smallest unit of the screen and in accordance with the number of the decode processors configured to perform decode processing.

Thus regardless of the screen size of the moving picture data being supplied, the bit stream analysis device 1 can split each screen appropriately into vertical bands in keeping with the screen size of the picture data. The vertical bands are each distributed to a different one of the decode processors configured to carry out parallel processing.

More specifically, as discussed above, the macro block data of which the horizontal position is larger than mb_offset(i) and less than mb_offset(i) plus mb_width(i) need only be transmitted to the decode processor 2(i).

[Processing Performed by the Decode Processor 2(i)]

As described above, each screen is split by the bit stream analysis device 1 into vertical bands, and the macro block data of the vertical bands thus formed are distributed to the respectively allotted decode processors 2(0) through 2(N−1) for decode processing.

Figure 7:
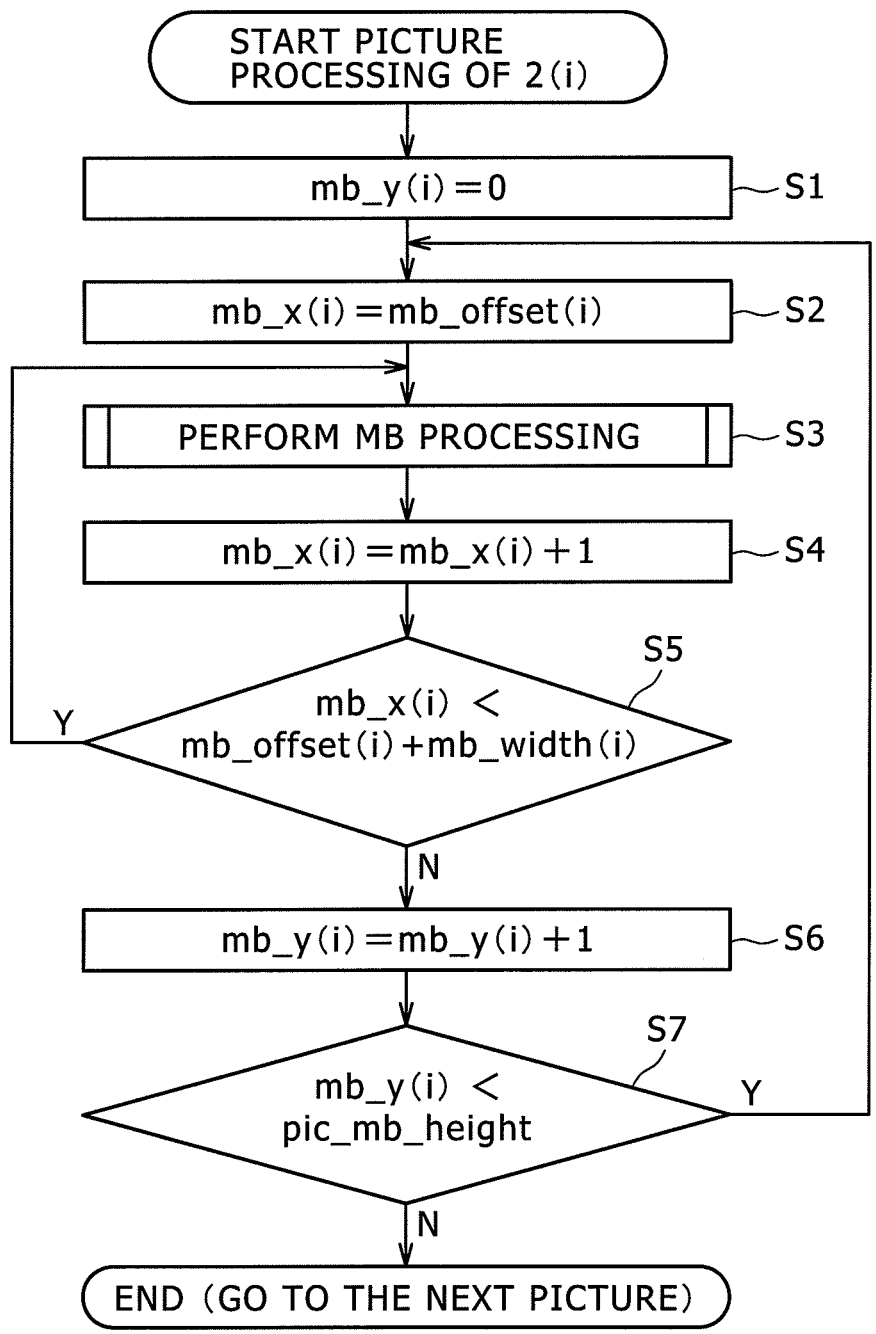
FIG. 7 is a flowchart explanatory of the decode processing performed by each of decode processors (0) through 2(N−1) decoding the vertical band allotted to the decode processor in question.
Figure 8:
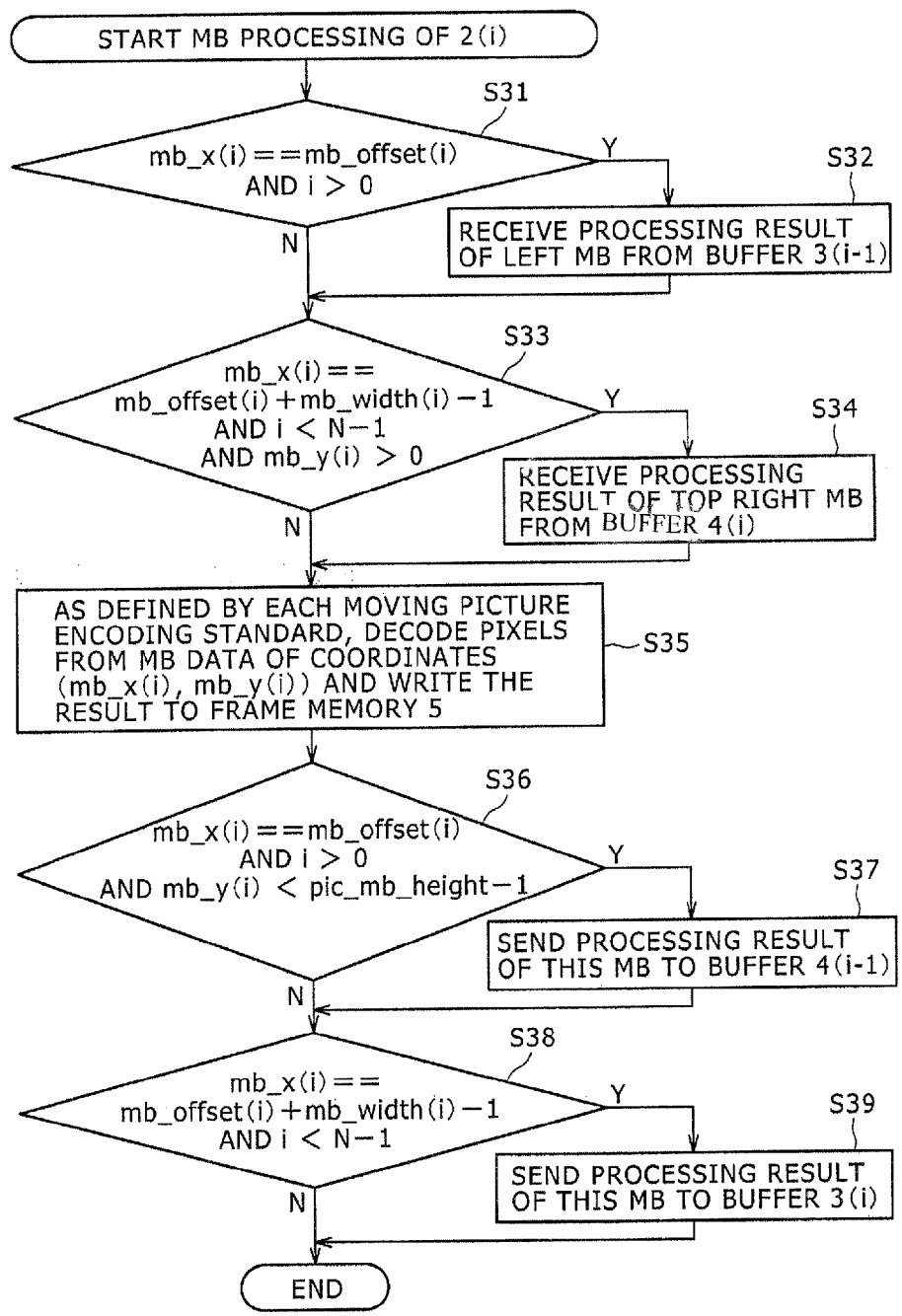
FIG. 8 is a flowchart explanatory of the decode processing performed in units of a macro block in step S3 of FIG. 7.

Described below in reference to the flowcharts of FIGS. 7 and 8 is the decode processing performed by each of the decode processors 2(0) through 2(N−1) included in the decode processing apparatus of this embodiment.

FIG. 7 is a flowchart explanatory of the decode processing performed by each of the decode processors (0) through 2(N−1) decoding the vertical band allotted to the decode processor in question. FIG. 8 is a flowchart explanatory of the decode processing performed in units of the macro block in step S3 of FIG. 7.

The decode processing carried out by each of the decode processor (0) through 2(N−1) shown in FIG. 1 is common to all the decode processors configured. Thus for purpose of simplification and illustration, the decode processing will be explained in the ensuing paragraphs as a process performed by the decode processors 2(i) ("i" is an integer between 0 and N−1).

Explained first is the decode processing of the vertical band of the screen allotted to each of the decode processors 2(0) through 2(N−1). When the picture data of a given screen is processed, the origin of the screen is defined as the top left position thereof. That is, as shown in FIG. 2, the origin is at (0, 0) defining the top left position along the horizontal and vertical axes (i.e., x and y axes).

The starting position for the processing of each vertical band (i.e., split area) is at 0 (zero) on the y axis and at mb_offset(i) on the x axis. That is, the starting position for the processing of each vertical band is determined to be (mb_offset(i), 0).

In step S1 of FIG. 7, the decode processor 2(i) sets 0 (zero) to a variable mb_y(i) indicative of the position on the y axis. In step S2, the decode processor 2(i) sets the value of the variable mb_offset(i) to a variable mb_x(i) indicative of the position on the x axis, the variable mb_offset(i) denoting the starting position on the x axis of the vertical band to be handled by the decode processor 2(i).

In step S3, the decode processor 2(i) performs the decode processing of the macro block (MB processing) in the position determined by (mb_x(i), mb_y(i)). The process of step S3 will be discussed later in more detail.

Upon completing the decode processing (MB processing) in step S3 of the macro block positioned at (mb_x(i), mb_y (i)), the decode processor 2(i) goes to step S4. In step S4, the decode processor 2(i) increments the variable mb_x(i) by "1."

The decode processor 2(i) goes to step S5 from step S4. In step S5, the decode processor 2(i) checks to determine whether the variable mb_x(i) indicative of the position on the x axis is smaller than the starting position mb_offset(i) of the vertical band in question on the x axis plus the value of the width mb_width(i) thereof.

The check in step S5 involves determining whether the decode processing (MB processing) is completed on all macro blocks constituting one macro block row in the vertical band that is handled by the decode processor 2(i).

If in step S5 it is determined that the decode processing (MB processing) has yet to be complete on all macro blocks making up one macro block row in the vertical band in question, then step S3 is reached again and the subsequent steps are repeated.

That is, if the variable mb_x(i) indicative of the position on the x axis is found smaller than mb_offset(i) plus mb_width (i), that means the decode processing has yet to be complete on all macro blocks constituting one macro block row. In this case, step S3 and the subsequent steps are repeated.

If in step S5 it is determined that the decode processing (MB processing) is completed on all macro blocks making up one macro block row in the vertical band in question, then step S6 is reached. In step S6, the decode processor 2(i) increments the variable mb_y(i) by "1."

That is, if the variable mb_x(i) indicative of the position on the x axis is found not smaller than mb_offset(i) plus mb_width(i), that means the decode processing is complete on all macro blocks constituting one macro block row. In this case, step S6 is reached and executed.

The decode processor 2(i) goes to step S7 from step S6. In step S7, the decode processor 2(i) checks to determine whether the variable mb_y(i) indicative of the position on the y axis is smaller than the picture height pic_mb_height of the screen.

The check in step S7 involves determining whether the decode processing (MB processing) is completed on all macro blocks constituting all macro block rows in the vertical direction of the vertical band that is handled by the decode processor 2(i).

If in step S7 it is determined that the decode processing (MB processing) has yet to be complete on all macro blocks making up all macro block rows in the vertical direction of the vertical band in question, then the decode processor 2(i) returns to step S2 and repeats step S2 and the subsequent steps.

That is, if the variable mb_y(i) indicative of the position on the y axis is found smaller than the picture height pic_mb_height of the screen, that means the decode processing has yet to be complete on all macro blocks constituting all macro block rows of the vertical band in question. In this case, step S2 and the subsequent steps are repeated so that the next macro block row may be processed.

If in step S7 it is determined that the decode processing (MB processing) is completed on all macro blocks making up all macro block rows in the vertical band in question, then the decode processor 2(i) terminates the processing shown in FIG. 7.

That is, if the variable mb_y(i) indicative of the position on the y axis is found not smaller than the picture height pic_mb_height of the screen, that means the decode processing is completed on all macro block rows constituting the vertical band in question. In this case, the processing shown in FIG. 7 is brought to an end, and the decode processing is started on a new screen (i.e., a new picture).

In the manner described above, each of the decode processors 2(i) configured in the decode processing apparatus of this embodiment regards the top left macro block of the vertical band to be handled by the decode processor in question as the starting block for decode processing.

The decode processor 2(i) performs decode processing of each of the macro blocks making up one macro block row ranging from the starting block to the rightmost block. Upon completing one macro block row, the decode processor 2(i) starts processing the next macro block row likewise. In this manner, each of the macro blocks in each vertical band is decoded starting from the top left block to the bottom right block.

[Decode Processing in Units of Macro Blocks (MB Processing)]

The decoding of the macro blocks (MB processing) performed in step S3 of FIG. 7 will now be described in reference to FIG. 8. The decode processor 2(i) of this embodiment performs decode processing in units of macro blocks as discussed above. When processing a given macro block, the decode processor $2(i)$ needs to reference the decoding results of the macro blocks positioned left, top left, on top, and top right of the macro block being targeted as shown in FIG. 12.

With the decode processing apparatus of this embodiment, as shown in FIG. 2, each screen is split into vertical bands that are each processed by a different one of the decode processors configured.

Thus when processing the leftmost or rightmost portion of a given vertical band, the decode processor $2(i)$ needs to receive the decoding results of macro blocks from another decode processor dealing with an adjacent vertical band. It might also become necessary for the decode processor $2(i)$ to offer the decoding results of macro blocks to another decode processor.

The transmission and reception of the decoding results of macro blocks between decode processors as mentioned above can be accomplished in the process show in FIG. 8. For purpose of simplification, the flowchart of FIG. 8 will be explained by describing in reference to FIG. 9 how decode processing results are transmitted and received between the decode processors handling adjacent vertical bands.

Figure 9:
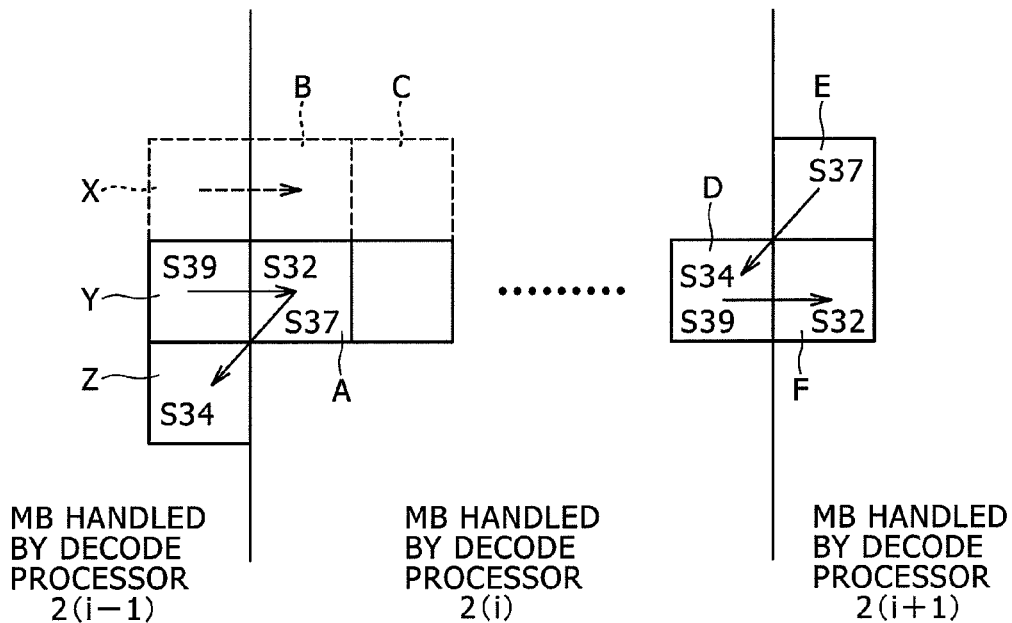
FIG. 9 is a schematic view explanatory of how decode processing results are transmitted and received between the decode processors each processing an adjacent vertical band in the decode processing apparatus of FIG. 1.

FIG. 9 is a schematic view explanatory of how decode processing results are exchanged between the decode processors each processing an adjacent vertical band in the decode processing apparatus of this embodiment.

Illustratively, suppose that in FIG. 9, a macro block A targeted to be decoded is positioned leftmost in the vertical band handled by the decode processor $2(i)$. In this case, decoding the macro block A requires obtaining the decoding results of macro blocks Y, X, B and C positioned left, top left, on top, and to right of the macro block A, respectively.

As shown in FIG. 9, each of the macro blocks X, Y and Z belongs to a different vertical band to be handled by another decode processor $2(i-1)$. For that reason, when decoding the macro block A in FIG. 9, the decode processor $2(i)$ receives the processing result of the macro block Y from the decode processor $2(i-1)$.

For its part, the decode processor $2(i-1)$ having decoded the macro block Y proceeds to transmit the decoding result to the decode processor $2(i)$. In this case, the decoding result of the macro block X positioned top left had already been received from the decode processor $2(i-1)$ when the decode processor $2(i)$ decoded the macro block B of the row immediately preceding that which the macro block A belongs to, as indicated by arrows in FIG. 9. The decoding result thus received is then utilized for decode processing.

The macro blocks B and C were already decoded by the same decode processor $2(i)$. Thus the decoding results of the macro blocks B and C need only be referenced by the same decode processor that decoded them earlier.

After performing the decode processing of the macro block A, the decode processor $2(i)$ transmits the decoding result to the decode processor $2(i-1)$. When decoding the macro block Z, the decode processor $2(i-1)$ receives and utilizes the decoding result of the macro block A transmitted from the decode processor $2(i)$.

The procedure above also applies substantially when a macro block D positioned rightmost in the vertical band processed by the decode processor $2(i)$ is to be processed, except that the order in which to transmit and receive data may be somewhat different.

That is, when decoding the macro block D, the decode processor $2(i)$ receives the decoding result of a macro block E from another decode processor $2(i+1)$ that handles an adjacent vertical band containing the macro block E and positioned right. Thus after decoding the macro block E, the decode processor $2(i+1)$ transmits the decoding result to the decode processor $2(i)$.

When processing the macro block D, the decode processor $2(i)$ needs the decoding results of the macro blocks positioned left, top left, and on top of the macro block D being targeted. These blocks have already been decoded by the decode processor $2(i)$ and thus the decoding results need only be utilized by the same decode processor.

After decoding the macro block D, the decode processor $2(i)$ transmits the decoding result to the decode processor $2(i+1)$. This allows the decode processor $2(i+1)$ when decoding a macro block F to utilize the decoding result of the macro block D positioned left of the macro block F being processed.

In the manner described above, the communications between the decode processors enable each decode processor processing the leftmost macro block of each macro block row in the vertical band handled by the decode processor in question to acquire the processing result of the macro block positioned left of the macro block being targeted. In this case, the processing result of the macro block positioned top left of the target macro block need only be stored following receipt during the processing of the immediately preceding macro block row. Likewise, when the rightmost macro block of each macro block row in each vertical band is to be processed, the processing result of the top right macro block may be obtained.

If the macro blocks positioned, left, top left, on top, and top right of the macro block targeted to be processed belong to the same vertical band, there is no need for communications between the decode processors. The results of the decode processing need only be retained by the same decode processor and utilized thereby.

As described, when the decode processing apparatus of this embodiment has one decode processor dealing with the leftmost or rightmost portion of a given vertical band, the decode processor in question is arranged to exchange decoding results with another decode processor that processes another vertical band adjacent to the currently processed vertical band.

The process for transmitting and receiving the decoding results is carried out in steps S32, S34, S37, and S39 of the decode processing shown in FIG. 8, to be explained below.

In practice, the results of decode processing are transmitted and received by way of first buffers 3(0) through 3(N−2) and second buffers 4(0) through 4(N−2) interposed between every two of the decode processors as shown in FIG. 1.

The decode processing in units of macro blocks performed in step S3 of FIG. 7 will now be described in detail by referring to FIG. 8. In the process of FIG. 7, as discussed above, the position of the macro block being targeted is designated by the variable mb_x(i) indicative of the position on the x axis and by the variable mb_y(i) representative of the position on the y axis.

In step S31 of FIG. 8, the decode processor $2(i)$ checks to determine whether the following two conditions 1 and 2 are met:

that the position mb_x(i) of the target macro block on the x axis should coincide with the starting position mb_offset (i) on the x axis of the vertical band targeted to be processed (condition 1); and that the vertical band in question should not be the leftmost vertical band of the screen (condition 2).

The check in step S31 thus involves determining whether the macro block targeted to be processed is positioned leftmost in the vertical band it belongs to and whether the vertical band in question is not the leftmost vertical band of the screen.

If in step S31 the conditions 1 and 2 above are both found to be met, the decode processor 2(i) goes to step S32. In step S32, the decode processor 2(i) receives the decode processing result of the macro block positioned left of the target macro block from the first buffer 3(i−1).

The process in step S32 is a process in which the macro block A targeted to be processed is decoded by receiving the decoding result of the macro block Y from the decode processor 2(i−1), as explained above in reference to FIG. 9.

If in step S31 at least one of the conditions 1 and 2 above is not found to be met, then step S33 is reached for another determination. Step S33 is also reached following the process of step S32.

In step S33, the decode processor 2(i) checks to determine whether the following three conditions 3, 4, and 5 are met:

that the position mb_x(i) of the macro block targeted to be processed should be equal to the starting position mb_offset(i) on the x axis of the currently handled vertical band, plus the width mb_width(i) of the vertical band in question, minus "1" (condition 3);

that the variable "i" should be equal to N−1 (condition 4); and that the position mb_y(i) on the y axis of the macro block targeted to be processed should be larger than 0 (zero) (condition 5).

The check in step S33 thus involves determining whether the target macro block is positioned rightmost in the vertical band it belongs to, whether the vertical band in question is not the rightmost vertical band of the screen, and whether the target macro block is not positioned in the first macro block row at the top of the vertical band in question.

If in step S33 the three conditions 3, 4, and 5 are all found to be met, the decode processor 2(i) goes to step S34. In step S34, the decode processor 2(i) receives the decode processing result of the macro block positioned top right of the target macro block from the second buffer 4(i).

The process in step S34 is a process in which, say, the macro block D targeted to be processed is decoded by receiving the decoding result of the macro block E from the decode processor 2(i+1), as explained above in reference to FIG. 9.

If in step S33 at least one of the three conditions 3, 4, and 5 above is not found to be met, then step S35 is reached for decode processing. Step S35 is also reached following the process of step S34.

In step S35, the decode processor 2(i) decodes pixels from the macro block data at the coordinates (mb_x(i), mb_y(i)) in a manner stipulated by the moving picture encoding standard used for the moving picture data targeted to be decoded. The decode processor 2(i) proceeds to write the decoding result to the frame memory 5.

The specific processing carried out in step S35 includes various processes performed by the above-described decode processors 2(0) through 2(N−1). An example of moving picture data decode processing is explained illustratively in paragraphs [0039] through [0051] of Japanese Patent Application No. 2006-129284. Since decode processing may vary depending on the moving picture encoding standard in use, the decoding will have to be carried out in accordance with the specifications of the individual moving picture encoding standard in effect.

The objective of step S35 is achieved when the decode processor 2(i) has completed its macro block decode processing. Thereafter, the decode processor 2(i) goes to step S36 for another determination.

In step S36, the decode processor 2(i) checks to determine whether the following three conditions 6, 7, and 8 are met:

that the position mb_x(i) on the x axis of the macro block targeted to be processed should coincide with the starting position mb_offset(i) on the x axis of the currently processed vertical band (condition 6);

that the variable "i" should be larger than 0 (zero) (condition 7); and that the position mb_y(i) on the y axis of the macro block targeted to be processed should be smaller than the picture height pic_mb_height minus "1" (condition 8).

The check in step S36 thus involves determining whether the target macro block is positioned leftmost in the vertical band it belongs to, whether the vertical band in question is not the leftmost vertical band of the screen, and whether the target macro block is not positioned in the macro block row at the bottom of the vertical band in question.

If in step S36 the three conditions 6, 7, and 8 are all found to be met, the decode processor 2(i) goes to step S37. In step S37, the decode processor 2(i) transmits the decode processing result of the target macro block to the second buffer 4(i−1).

The process in step S36 is a process in which, say, the macro block A is targeted for decoding and the decoding result of the macro block A is transmitted to the decode processor 2(i−1), as explained above in reference to FIG. 9.

If in step S36 at least one of the three conditions 6, 7, and 8 above is not found to be met, then step S38 is reached for another determination. Step S38 is also reached following the process of step S37.

In step S38, the decode processor 2(i) checks to determine whether the following two conditions 9 and 10 are met:

that the position mb_x(i) on the x axis of the macro block targeted to be processed should be the same as the starting position mb_offset(i) on the x axis of the currently processed vertical band, plus the width mb_width(i) of the vertical band in question, minus "1" (condition 9); and that the variable "i" should be the same as N−1 (condition 10).

The check in step S38 thus involves determining whether the target macro block is positioned rightmost in the vertical band it belongs to and whether the vertical band in question is not the rightmost vertical band of the screen.

If in step S38 the conditions 9 and 10 above are both found to be met, the decode processor 2(i) goes to step S39. In step S39, the decode processor 2(i) transmits the decode processing result of the target macro block to the first buffer 3(i).

The process in step S38 is a process which, say, the macro block D is targeted for decoding and the decoding result of the macro block D is transmitted to the decode processor 2(i+1), as explained above in reference to FIG. 9.

If in step S38 at least one of the conditions 9 and 10 above is not found to be met, then the processing shown in FIG. 8, i.e., the decode processing of the target macro block, is brought to an end. The processing in FIG. 8 is also terminated following the process of step S39.

It might happen that in step S32 or S34 for data reception in the processing of FIG. 8, there is no decode processing result in the buffer 3(i−1) or 4(i) from which to read the result. If that happens, the decode processor waits for the decode processing result to be input to the buffer.

It might also happen that in step S37 or S39 for data transmission in the processing of FIG. 8, the buffer 4(i−1) or 3(i) to which to write the decode processing result turns out to be full of data. In that case, the decode processor waits for the buffer to become vacant.

As described, so-called blocking access is implemented using buffers interposed between the decode processors configured. This makes it possible to control the order in which to process macro blocks easily and appropriately.

As explained above in reference to FIGS. 7 and 8, each of the decode processors 2(0) through 2(N−1) in the decode processing apparatus of this embodiment performs decode processing one macro block at a time. Also, the decode processors 2(0) through 2(N−1) in the decode processing apparatus of this embodiment parallelly decode the macro block rows that are staggered one on top of the other in each of the different vertical bands of the screen.

That is, the macro block rows targeted to be processed are staggered one row on top of the other, each row being handled by one of the decode processors ranging from the decode processor to which is allotted the leftmost vertical band of the screen to the decode processor to which is allotted the rightmost vertical band.

Figure 10:
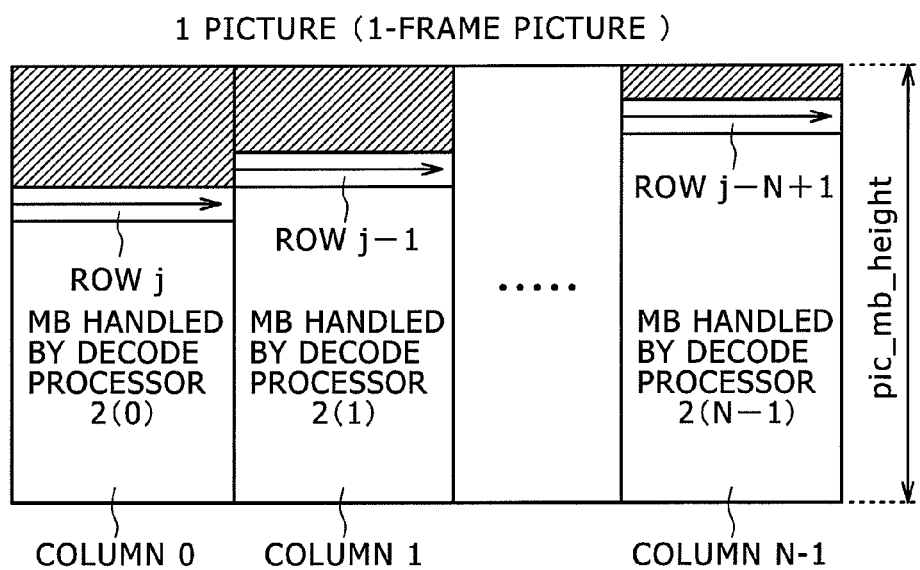
FIG. 10 is a schematic view explanatory of how the decode processors (0) through 2(N−1) perform decode processing in parallel.
Figure 11:
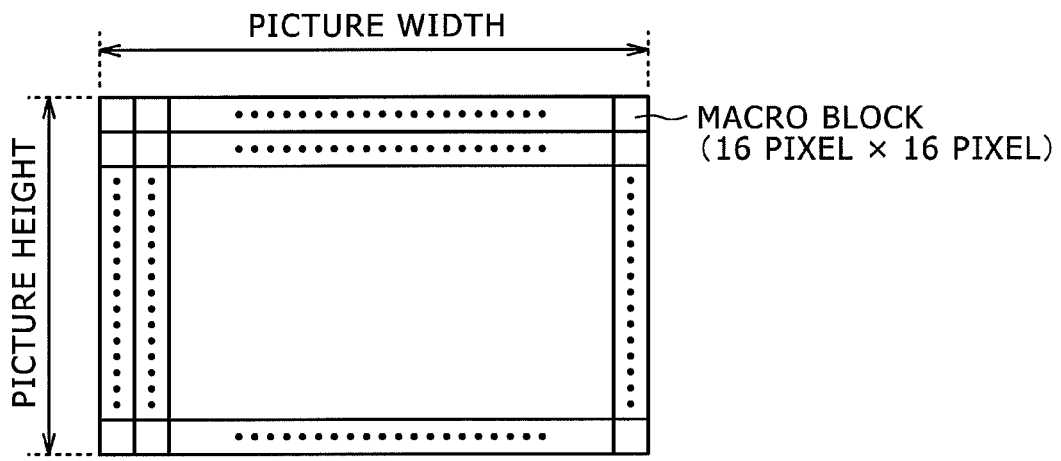
FIG. 11 is a schematic view explanatory of relations between a screen and macro blocks.

FIG. 10 is a schematic view explanatory of how the decode processors (0) through 2(N−1) perform decode processing in parallel. For the decode processing apparatus of this embodiment, it is assumed that the macro block row "j" (N−1≤j<pic_mb_height) belonging to the leftmost vertical band (column 0) is targeted to be processed.

On that assumption, in the vertical band of column 1, a macro block row j−1 is targeted to be processed; in the vertical band of column 2, a macro block row j−2 is targeted to be processed, and so on. In the vertical band of column N−1, a macro block row j−N+1 is targeted to be processed.

With the decode processing apparatus of this embodiment, as described, the vertical bands of the screen are decoded in parallel by the decode processors ranging from the decode processor to which is allotted the leftmost vertical band of the screen to the decode processor to which is allotted the rightmost vertical band, the vertical bands being staggered by one macro block row per decode processor.

Effects of the Embodiment

As mentioned above, the decode processing apparatus equipped with a plurality of decode processors for performing decode processing in units of macro blocks are faced with three major problems when attempting to improve efficiency in parallelly executing decode processing:
(a) Processor wait times stemming from the order in which macro blocks are allotted to different processors for processing;
(b) The degree of complexity in the scheme for correctly controlling the order in which to process the macro blocks; and
(c) The frequency of communicating the processing results of the macro blocks to be referenced, together with the cost of such data transfers required.

According to the decode processing apparatus of the above-described embodiment, as explained in detail with reference to FIG. 10, the vertical bands of the screen are decoded parallelly by the decode processors configured, the vertical bands being staggered by one macro block row per decode processor. This arrangement resolves the problem (a) above.

The reason for the resolution above is this: that whereas decoding the leftmost macro block on each of the macro block rows in each vertical band requires the decoding results of the macro blocks positioned left and top left of the target macro block, the macro block rows containing the macro blocks positioned left and top left have already been processed by other decode processors.

Whereas decoding the rightmost macro block on each of the macro block rows in each vertical band requires the decoding result of the macro block positioned top right of the target macro block, the macro block row containing the macro block positioned top right is being processed parallelly by another decode processor. It follows that when the rightmost portion of the currently processed macro block row is reached, there is a high possibility that the macro block positioned top right has already been processed.

In the manner described above, the problem (a) above can be resolved by having the macro block rows staggered one on top of the other for processing by the decode processors configured.

The order in which to process macro blocks is automatically controlled through communications between the processors handling the leftmost and rightmost macro blocks in each vertical band according to the decode processing apparatus of the above-described embodiment. The control can be accomplished by a standard block communication mechanism; no specialized device is necessary for the purpose. This feature eliminates the problem (b) above.

In the decode processing apparatus of the above-described embodiment, the communications between different processors are needed only with regard to the leftmost and rightmost macro blocks in each vertical band of the screen. This means that the problem (c) above is minimized.

In particular, when a given macro block is targeted to be processed by a given decode processor, the macro block positioned on top of the target macro block is processed by the same decode processor. There is no need to resort to the costly communication of the processing result of the top macro block between different processors. The data can be transferred through a primary cache or like high-speed memory tightly coupled with the decode processor in question, which is a distinct advantage.

As outlined above, the decode processing apparatus of the above-described embodiment is capable of resolving all three problems (a), (b) and (c).

As another advantage, the need to time synchronization between decode processors arises only at the leftmost and rightmost portions of the macro block rows in each of the vertical bands of the screen. In other words, the point at which one decode processor is likely to wait for data from another decode processor is found only at the leftmost and rightmost portions of the macro block rows in each vertical band.

For that reason, even if there are differences in processing time between macro blocks, the processing times tend to be equalized for each macro block row in each vertical band. Decode processing is performed parallelly with the highest possible degree of efficiency if there is little difference in processing time between the different decode processors dealing with the macro block rows (not individual macro blocks) in each vertical band.

If the number of macro blocks disposed vertically in the picture is sufficiently large, the total decode processing time can be defined approximately as "1" divided by the number of the processors configured (i.e., 1/processor count). That is, the speed of decode processing can be enhanced.

[Method and Program of this Invention]

As explained above in reference to FIGS. 2 through 6B, the bit stream analysis device 1 splits the screen formed by moving picture data into a plurality of portions of which the macro block data are then distributed to a plurality of decode processors. The splitting of the screen and the distribution of the data are accomplished using methods according to the present invention.

The bit stream analysis device 1 may be constituted by a computer. It follows that the method for splitting the screen and that for distributing the moving picture data, explained above in reference to FIGS. 2 through 6B, may be implemented using a program executed by the bit stream analysis device 1. This program constitutes a data distribution program embodying the present invention in a manner executable by the bit stream analysis device 1.

The method for decoding encoded moving picture data, discussed above in reference to FIGS. 7 through 10, constitutes a decode processing method embodying the present invention. The program for causing the processes shown in FIGS. 7 through 10 to be carried out by the decode processors constitutes a decode processing program embodying the present invention.

[Others]

There are no constraints on the resolution of pictures or on the number of parallelly executed processes for decoding. Moving picture data of diverse resolutions may be decoded using the apparatus, method, or program of the embodiments of the present invention. Also, there may be provided a desired number of decode processors configured for parallel decode processing.

For example, the present invention is particularly advantageous if implemented so as to have three decode processors configured in parallel for decoding full-HD (1,920×1080 pixels) pictures. That is, the benefits of the invention are pronounced when the number of the configured decode processors is not very large compared to the number of vertically disposed macro blocks.

The reason the limited number of decode processors are preferred in the case above is this: that if too many decode processors are furnished, then the higher or the lower the target portion to be decoded in the picture, the larger the number of processors becoming redundant. Contrary to the expectations, a larger number of decode processors tend to bring about more redundant decode processors resulting in worsened efficiency.

Obviously, the number of decode processors may be determined appropriately so as to perform decode processing efficiently when pictures of diverse resolutions are processed, whether they have resolutions lower or higher than full-HD.

The screen may be split into vertical bands in diverse ways. For example, the central part of the screen may be split into wider or narrower vertical bands than the other parts of the screen. However, as discussed above in conjunction with the embodiment of this invention, the screen should preferably be split into vertical bands of approximately the same width in order to maximize the benefits of the invention. Splitting the screen this way makes it highly likely to minimize differences in processing time between macro block rows.

Alternatively, decode processors of different levels of performance may be combined for use. In such a case, the width of the vertical band allotted to each of the configured decode processors may be adjusted in keeping with the performance of the processor in question.

Specifically, wider vertical bands may be allotted to decode processors of higher performance, while narrower vertical bands may be assigned to decode processors of lower performance.

In another situation where the multiple decode processors configured are approximately the same in performance, they may have to deal with different loads depending on the picture data of the allotted vertical bands being processed.

In that case, the features of the picture data targeted to be decoded such as the quantities of the AC components in DCT coefficients output from the bit stream analysis device 1 are acquired. The quantities thus obtained are used to distinguish the processing blocks that will likely become heavier loads when decoded from those that will prove to be lighter decoding loads.

A vertical band may then be made narrower if it is found to contain many processing blocks likely to be heavier loads when decoded; a vertical band may be made wider if it is found to have few processing blocks of heavy decoding loads.

As described, it is possible to determine the width of the vertical band allotted to each decode processor in such a manner that the decode processing loads on the multiple decode processors configured are equalized among them as much as possible.

With the above-described embodiment, if a remainder is produced from the division of the picture width by the number of the configured decode processors, then the widths of the vertical bands are adjusted accordingly starting from the leftmost vertical band in the screen, as discussed above in reference to FIGS. 4A through 5B. Alternatively, the widths of the vertical bands may be adjusted from the rightmost vertical band in the screen.

As another alternative, the widths of the vertical bands may be adjusted in a predetermined order, illustratively from the vertical bands in the central part of the screen to the rightmost vertical band to the leftmost vertical band. That is, the widths of the vertical bands may be adjusted in a desired order of the bands disposed in the screen.

The decode processors may be implemented by a software program run on the CPU, as will be described later. Naturally, the decode processors may also be implemented by hardware circuitry or realized in any other appropriate manner. The decode processors may also be located in a plurality of pieces of equipment that are operated in parallel for function distribution.

The buffering module may be implemented by hardware involving the use of FIFO circuits or by software entailing the use of a semaphore. Simply put, the semaphore is a scheme that synchronizes parallelly running processes and controls interrupt processing.

For purpose of simplification and illustration, the above-described embodiment was shown to have each of the first buffers 3(0) through 3(N−2) and of the second buffers 4(0) through 4(N−2) interposed between every two of the decode processors configured. Alternatively, the buffering module may be arranged to act as a single module that transmits and receives data between decode processors while arbitrating requests from all these processors.

The essential preconditions for the decode processing apparatus of the above-described embodiment are limited to the relations of dependence between the target area to be decoded and the areas positioned left, top left, on top, and top right thereof. As long as two-dimensional data processing involving similar relations of dependence is concerned, the invention applies not only to the decoding of moving pictures but also to other diverse processes such as encoding, still picture processing, and picture quality enhancement.

That is, whereas the present invention was described above in the form of an embodiment for carrying out decode processing, the invention may also be practiced alternatively as an embodiment that splits the screen into a plurality of vertical bands as discussed above and encodes each of these vertical bands in units of macro blocks.

For the alternative embodiment above, it may become necessary to acquire the processing result from the encoding of a macro block in an adjacent vertical band. In that case, data may be transmitted and received between a plurality of encoding processors as in the case of the decode processing discussed above.

There is no need to limit the processing unit (i.e., data unit subject to dependence) to the macro block of 16 by 16 pixels.

Data may be processed in units of processing blocks that may occur in diverse sizes and shapes.

Processing blocks may be changed in terms of the direction of dependence therebetween as well as the direction in which to split or scan the blocks. Such relations and directions may be rotated or inverted as desired, whereby processing blocks of different versions may be obtained. That is, according to this invention, the direction in which to split or otherwise manipulate the blocks to be processed such as macro blocks may be adjusted relative to the positions of the processing blocks of which the processing results need to be referenced. In this manner, the invention may be implemented in a manner offering suitable picture processing such as decoding.

With regard to the above-described embodiment, it was explained that the target macro block is processed by referencing the decode processing results of the macro blocks positioned left, top left, on top, and top right of the target block. However, this is not limitative of the present invention.

Alternatively, the embodiments of the invention also apply when only the macro blocks positioned left and top left of the macro block targeted to be processed are to be referenced. In this case, if the macro block A is targeted to be processed as discussed above in reference to FIG. 9, then the processing result of the macro block Y may be transmitted from the decode processor $2(i-1)$ to the decode processor $2(i)$. When the macro block A is being processed, the decode processor (i) need only receive the processing result of the macro block Y from the decode processor $2(i-1)$.

Likewise, the embodiments of the present invention also apply when the target macro block is processed by referencing only the macro block positioned top right of the target block. In this case, if the macro block D is targeted to be processed as discussed above in reference to FIG. 9, the processing result of the macro block E may be transmitted from the decode processor (i+1) to the decode processor $2(i)$. When the macro block D is being processed, the decode processor (i) need only receive the processing result of the macro block E from the decode processor $2(i+1)$.

The present application contains subject matter related to that disclosed in Japanese Priority Patent Application JP 2009-124180 filed in the Japan Patent Office on May 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A decode processing apparatus comprising:
   a bit stream analysis device operable to:
      split a screen of encoded moving picture data into a plurality of vertical bands;
      distribute each of the plurality of vertical bands to a plurality of processors, wherein the plurality of processors are operable to:
      decode the plurality of vertical bands of the encoded moving picture data in parallel in units of a predetermined processing block, wherein a communication of decoded moving picture data between the plurality of processors occurs when a leftmost processing block and a rightmost processing block in each of the plurality of vertical bands is decoded; and
      generate picture data of the screen based on the decoded moving picture data; and
   a first temporary storage and a second temporary storage interposed between each pair of processors of the plurality of processors, wherein
      the first temporary storage only communicates the decoded moving picture data from a first processor of the plurality of processors to a second processor, immediately following the first processor, of the plurality of processors, and
      the second temporary storage only communicates the decoded moving picture data from the second processor to the first processor, and wherein
   the first temporary storage and the second temporary storage for each pair of processors of the plurality of processors are different.

2. The decode processing apparatus according to claim 1, wherein
   each of the plurality of vertical bands is allotted to each of the plurality of processors operable to process a processing block of interest using processing blocks positioned left, top left, and top right of the processing block of interest in each of processing block rows proceeding from top to bottom,
   wherein if another vertical band of the plurality of vertical bands is positioned left of an allotted vertical band and if a leftmost processing block of the allotted vertical band is to be processed, one of the plurality of processors are operable to receive a processing result of a processing block positioned left of the processing block of interest, from another of the plurality of processors that processes the another vertical band, wherein
   the plurality of processors are operable to perform decode processing using the received processing result of the processing block positioned left and the processing result of the processing block received during the processing of one or more processing blocks in an upper row, and wherein
   the plurality of processors are operable to transmit the received processing result of the decode processing to another of the plurality of processors operable to process the another vertical band positioned left.

3. The decode processing apparatus according to claim 1, wherein
   the first temporary storage and the second temporary storage are operable to transmit and receive processing results, wherein
   the plurality of processors ready to receive a processing result is placed in a wait state if a receiving area of a temporary storage accessible by the plurality of processors is vacant, and
   the plurality of processors that are ready to transmit the processing result is placed in a wait state if a transmitting area of the temporary storage accessible by the plurality of processors is full.

4. The decode processing apparatus according to claim 1, wherein
   the plurality of processors are operable to operate in parallel after starting to perform decode processing one after another in a manner starting from the leftmost vertical band of the plurality of vertical bands and ending at the rightmost vertical band of the plurality of vertical bands allotted thereto, and wherein
   the start of decode processing of a processing block row by one of the plurality of processors is followed by another of the plurality of processors to which is allotted a vertical band positioned immediately right of the current vertical band of the plurality of vertical bands and which starts decode processing after one processing block row delay to form a stepped pattern on the screen.

5. The decode processing apparatus according to claim 1, wherein the bit stream analysis device is operable to convert a horizontal width of the screen into a width in units of the horizontal width of the processing block as a smallest unit, wherein
the bit stream analysis device is operable to divide the converted horizontal width of the screen by a count of the plurality of processors, wherein
if the division produces no remainder, the bit stream analysis device is operable to split a quotient of the division into horizontal widths each pertaining to each of the plurality of vertical bands, and
wherein if the division produces a remainder, the bit stream analysis device is operable to regard the quotient of the division as a horizontal reference width for each of the plurality of vertical bands, and add a value of 1 to the horizontal reference width for each of the remaining vertical bands of the plurality of vertical bands of which the count corresponds to the remainder and which proceed from left to right on the screen, whereby the horizontal width of each of the plurality of vertical bands is determined so that the screen may be split into the plurality of vertical bands accordingly.

6. The decode processing apparatus according to claim 1, wherein each of the plurality of vertical bands is allotted to each of the plurality of processors operable to perform decode processing of each processing block in each of processing block rows proceeding from top to bottom,
wherein one of the plurality of processors is operable to use a processing result of a processing block positioned left of a processing block of interest,
wherein if another vertical band is positioned right of an allotted vertical band and if the rightmost processing block of the allotted vertical band is processed, the one of the plurality of processors is operable to transmit the processing result of the rightmost processing block to another of the plurality of processors operable to process the another vertical band positioned right, and
wherein if another vertical band is positioned left of the allotted vertical band and if the leftmost processing block of the allotted vertical band is to be processed, the one of the plurality of processors is operable to receive the processing result of the processing block being targeted from the another of the plurality of processors operable to process the another vertical band positioned left.

7. The decode processing apparatus according to claim 1, wherein each of the plurality of vertical bands is allotted to each of the plurality of processors operable to perform decode processing of each processing block in each of processing block rows proceeding from top to bottom,
wherein one of the plurality of processors is operable to use a processing result of a processing block positioned top right of a processing block of interest,
wherein if another vertical band is positioned left of an allotted vertical band and if the leftmost processing block of the allotted vertical band is processed, the one of the plurality of processors is operable to transmit the processing result of the leftmost processing block to the another of the plurality of processors operable to process the another vertical band positioned left, and wherein
if another vertical band is positioned right of the allotted vertical band and if the rightmost processing block of the allotted vertical band is to be processed, the one of the plurality of processors is operable to receive the processing result of the processing block being targeted from another of the plurality of processors operable to process the another vertical band positioned right.

8. A decode processing method comprising:
in a decode processing apparatus:
splitting a screen of encoded moving picture data into a plurality of vertical bands;
distributing each of the plurality of vertical bands to a plurality of at least three processors;
decoding the plurality of vertical bands of the encoded moving picture data in units of a predetermined processing block by the at least three processors, wherein a communication of decoded moving picture data between the at least three processors occurs when a leftmost processing block and a rightmost processing block in each of the plurality of vertical bands is decoded;
generating picture data of the screen based on the decoded moving picture data by the at least three processors, wherein
a first temporary storage and a second temporary storage are interposed between each pair of processors of the at least three processors, wherein the first temporary storage communicates the decoded moving picture data from
a first processor of the plurality of at least three processors to a second processor, immediately following the first processor, of the at least three processors, and
the second temporary storage communicates the decoded moving picture data from the second processor to the first processor, and wherein
the first temporary storage and the second temporary storage for each pair of processors of the at least three processors are different.

9. The decode processing method according to claim 8, wherein each of the plurality of vertical bands is allotted to each of the at least three processors operable to process a processing block of interest using processing blocks positioned left, top left, and top right of the processing block of interest in each of processing block rows proceeding from top to bottom, the decode processing method further comprising:
if another vertical band of the plurality of vertical bands is positioned left of an allotted vertical band and if a leftmost processing block of the allotted vertical band is to be processed, receiving a processing result of the processing block positioned left of the processing block of interest by one of the at least three processors, from another of the at least three processors operable to process the another vertical band positioned left;
performing decode processing using the received processing result of the processing block positioned left and the processing result of the processing block received during the processing of blocks in an upper row;
transmitting a result of the decode processing to the at least three processors operable to process the another vertical band positioned left;
if another vertical band is positioned right of the allotted vertical band and if the rightmost processing block of the allotted vertical band is to be processed, receiving the processing result of the processing block positioned top right of the processing block of interest, from the at least three processors operable to process the another vertical band positioned right;
performing decode processing using the received processing result of the processing block positioned top right; and transmitting the result of the decode processing to the plurality of at least three processors operable to process the another vertical band positioned right.

10. The decode processing method according to claim 8, wherein the first temporary storage and the second temporary storage transmit and receive processing results, the decode processing method further comprising:

placing the at least three processors, ready to receive a processing result, in a wait state if a receiving area of a temporary storage accessible by the at least three processors is vacant; and placing the at least three processors, ready to transmit the processing result, in a wait state if a transmitting area of the temporary storage accessible by the at least three processors is full.

11. A non-transitory computer readable medium having at least one code section for performing decode processing of encoded moving picture data, the at least one code section being executable by a computer for causing the computer to perform steps comprising:

splitting a screen of the encoded moving picture data into a plurality of vertical bands;

distributing the encoded moving picture data belonging to each of the plurality of vertical bands to a plurality of processors, wherein a communication of decoded moving picture data between the plurality of processors occurs when a leftmost processing block and a rightmost processing block in each of the plurality of vertical bands is decoded, wherein a first temporary storage and a second temporary storage are interposed between each pair of processors of the plurality of processors, wherein the first temporary storage only communicates the decoded moving picture data from a first processor of the plurality of processors to a second processor, immediately following the first processor, of the plurality of processors, and the second temporary storage only communicates the decoded moving picture data from the second processor to the first processor, and wherein the first temporary storage and the second temporary storage for each pair of processors of the plurality of processors are different.

12. A non-transitory computer readable medium executed by each of a plurality of computers which are incorporated in a decode processing apparatus having at least one code section for performing decode processing of moving picture data, the at least one code section being executable by a computer of the plurality of computers for causing the computer to perform steps comprising:

when performing decode processing of each processing block, causing a first computer of the plurality of computers to use processing results of processing blocks positioned left, top left, and top right of a processing block of interest;

if a vertical band of the moving picture data is positioned left of an allotted vertical band and if a leftmost processing block of an allotted vertical band is to be processed, causing the first computer to receive the processing result of the processing block positioned left of the processing block of interest from a second computer of the plurality of computers caused to process the another vertical band positioned left;

causing the first computer to perform decode processing using the processing result of the processing block positioned left and the processing result of the processing block positioned left received during the processing of blocks in the upper row;

causing the first computer to transmit the result of the decode processing to the second computer caused to process the another vertical band positioned left;

if another vertical band is positioned right of the allotted vertical band and if the rightmost processing block of the allotted vertical band is to be processed, causing a computer of interest of the plurality of computers to receive the processing result of the processing block positioned right of the processing block of interest from the second computer caused to process the another vertical band positioned right;

causing the computer of interest to perform decode processing using the processing result of the processing block positioned top right; and causing the computer of interest to transmit the result of the decode processing to the second computer caused to process the another vertical band positioned right, wherein communication of decoded moving picture data between the plurality of computers occurs when a leftmost processing block and a rightmost processing block in each vertical band is decoded, and wherein a first temporary storage and a second temporary storage are interposed between each pair of computers of the plurality of computers, wherein the first temporary storage only communicates the decoded moving picture data from one computer of the plurality of computers to another computer, immediately following the one computer, of the plurality of computers, and the second temporary storage only communicates the decoded moving picture data from the another computer to the one computer, and wherein the first temporary storage and the second temporary storage for each pair of computers of the plurality of computers are different.

13. The non-transitory computer readable medium according to claim 12, wherein the first temporary storage and the second temporary storage interposed between each pair of computers of the plurality of computers transmit and receive processing results, the at least one code section causing the computer to perform steps comprising:

placing a computer ready to receive a processing result in a wait state if a receiving area of a temporary storage accessible by the plurality of computers is vacant; and placing the computer ready to transmit the processing result in a wait state if a transmitting area of the temporary storage accessible by the plurality of computers is full.

14. The decode processing apparatus according to claim 1, wherein if another vertical band is positioned right of an allotted vertical band and if the rightmost processing block of the allotted vertical band is to be processed, one of the plurality of processors is operable to receive a processing result of the processing block positioned top right of a processing block of interest from one of the plurality of processors that processes the another vertical band positioned right, wherein the plurality of processors are operable to perform decode processing using the received processing result of the processing block positioned top right, and the plurality of processors are operable to transmit a result of the decode processing to another of the plurality of processors operable to process the another vertical band positioned right.

* * * * *